(12) United States Patent
Muraji et al.

(10) Patent No.: US 6,867,582 B2
(45) Date of Patent: Mar. 15, 2005

(54) NON-CONTACT POSITION SENSOR HAVING SPECIFIC CONFIGURATION OF STATORS AND MAGNETS

(75) Inventors: Tetsuo Muraji, Odawara (JP); Mitsuru Sekiya, Odawara (JP)

(73) Assignee: Mikuni Corporation, Tokyo (JP)

( * ) Notice: Subject to any disclaimer, the term of this patent is extended or adjusted under 35 U.S.C. 154(b) by 201 days.

(21) Appl. No.: 10/084,945

(22) Filed: Mar. 1, 2002

(65) Prior Publication Data

US 2002/0153879 A1 Oct. 24, 2002

Related U.S. Application Data

(63) Continuation of application No. PCT/JP00/05842, filed on Aug. 29, 2000.

(30) Foreign Application Priority Data

Sep. 9, 1999 (JP) ............................................ 11-255409

(51) Int. Cl.$^7$ .............................. G01B 7/30; G01D 5/14
(52) U.S. Cl. ............................... 324/207.2; 324/207.24; 324/207.25
(58) Field of Search .......................... 324/207.4, 207.2, 324/207.22, 207.21, 207.24, 207.25, 235, 251, 252; 369/136, 146, 148; 341/32; 323/368; 400/479, 2

(56) References Cited

U.S. PATENT DOCUMENTS

| | | | |
|---|---|---|---|
| 4,535,289 A | 8/1985 | Abe et al. | |
| 4,597,071 A | * 6/1986 | Ito et al. | 369/136 |
| 5,128,613 A | * 7/1992 | Takahashi | 324/235 |
| 5,532,585 A | 7/1996 | Oudet et al. | |
| 5,861,745 A | * 1/1999 | Herden | 324/207.2 |

FOREIGN PATENT DOCUMENTS

| | | |
|---|---|---|
| EP | 0 611 951 A2 | 8/1994 |
| JP | HEI 7-500421 | 1/1995 |
| JP | 8-35809 A | 2/1996 |
| JP | 08-285518 | 11/1996 |
| JP | 09-014908 | 1/1997 |
| WO | WO 01/20250 A1 | 3/2001 |

OTHER PUBLICATIONS

Notification of Transmittal of copies of Translation of the International Preliminary Examination Report (PCT/IB/338) (in English).
International Preliminary Examination Report (PCT/IPEA/409) with English translation.

* cited by examiner

*Primary Examiner*—Walter E. Snow
(74) *Attorney, Agent, or Firm*—Staas & Halsey LLP

(57) ABSTRACT

A non-contact position sensor including a first stator having two magnet facing sides, a second stator having one magnet facing side aligned with the two magnet facing sides along a locus, a hall element between the first and second stators, and two magnets located next to each other along the locus opposite the three magnet facing sides so as to move freely along the locus. When configured as a rotary sensor, an arbitrary angle of usage can be set. When configured as a linear sensor, a magnet can be made thick without increasing leakage of magnetic flux.

57 Claims, 18 Drawing Sheets

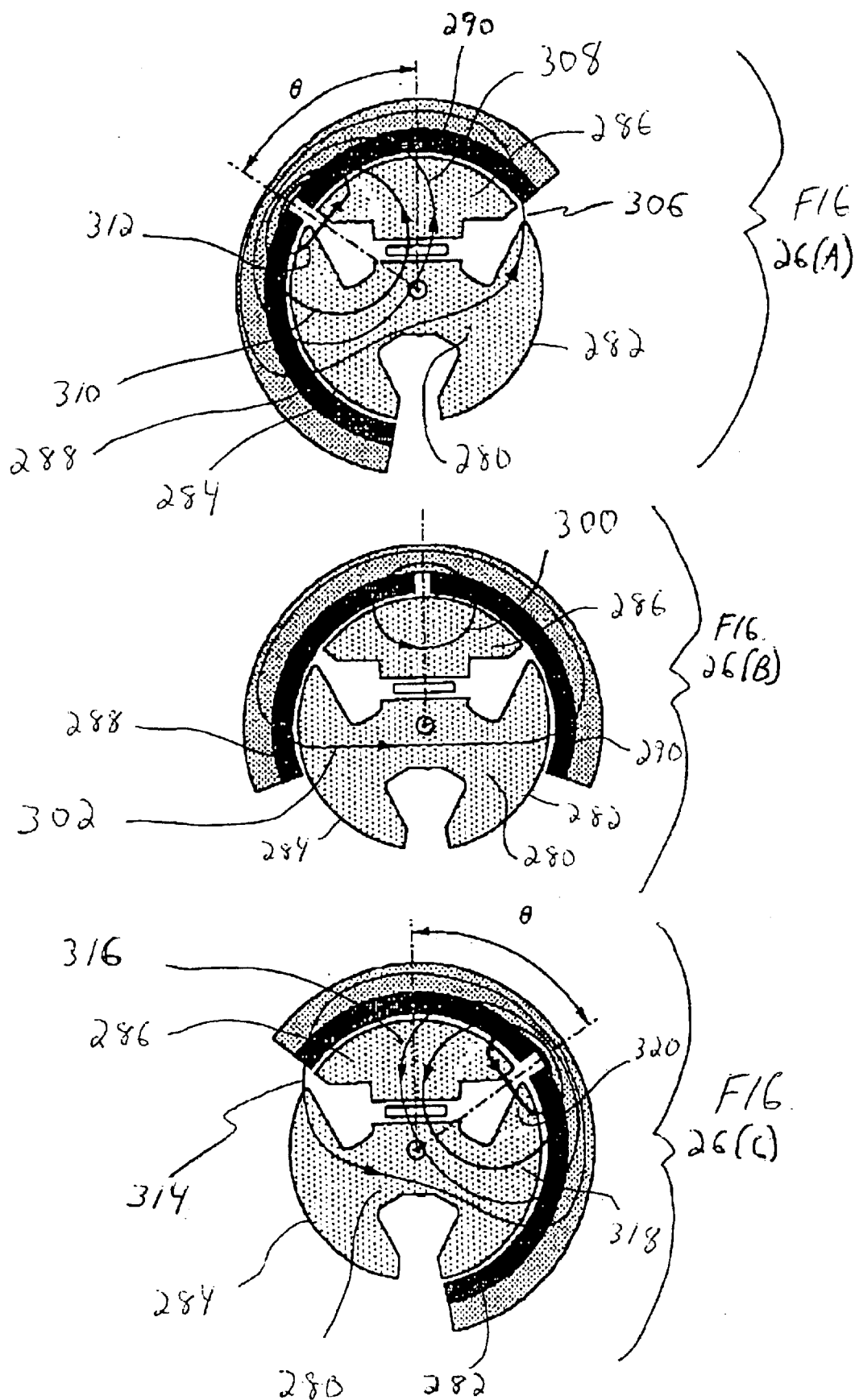

NON-CONTACT POSITION SENSOR HAVING SPECIFIC CONFIGURATION OF STATORS AND MAGNETS

CROSS-REFERENCE TO RELATED APPLICATIONS

Continuation of prior application No: PCT/JP00/05842. This is a continuing application, filed under 35 U.S.C. §111(a), of International Application PCT/JP00/05842, filed Aug. 29, 2000. it being further noted that foreign priority benefit is based upon Japanese Patent Application 11-255409, filed Sep. 9, 1999.

BACKGROUND OF THE INVENTION

1. Field of the Invention

The present invention relates to a non-contact position sensor for sensing changes in magnetic flux and converting the changes to a voltage, and in particular relates to a sensor employing a stator with three magnet facing sides that face magnets.

2. Description of the Related Art

Rotary sensors and linear sensors are examples of non-contact position sensors employing a hall element. FIG. 1 is a cross-sectional view of the center of a rotary sensor disclosed in Japanese Laid-open Publication No. Hei. 8-35809. As shown in FIG. 1, a coupling shaft 1 has a cylindrical rotor 2 on an outer side, with a cylindrical permanent magnet 3 being fixed to the inner side of the rotor 2. Two semi-cylindrical stators 4 and 5 are then fixed at the inner side of the permanent magnet 3 in such a manner as to leave a slight gap with respect to the permanent magnet 3. A gap 6 extending diameter-wise is formed between the stators 4 and 5 and a hall element 7 is provided in the gap 6.

When the cylindrical rotor 2 and the permanent magnet 3 rotate about the periphery of the stators 4 and 5, the magnetic flux passing through the hall element 7 changes. This change in magnetic flux is reflected as a change in the voltage of the hall element 7. The angle of rotation of the rotor 2 can then be measured by measuring the change in this voltage.

FIGS. 2(A), 2(B) and 2(C) are views showing a configuration for a linear sensor disclosed in Japanese Patent Publication No. Hei. 7-500421. This sensor comprises a hall element 11, stators 12 and 13 provided so as to sandwich the hall element 11, and a moveable magnet 14, with a further stator 15 being provided on the opposite side to the stators 12 and 13 of the moveable magnet 14.

The moveable magnet 14 is fitted to a slider 16, with the slider 16 moving in a lengthwise direction. When the moveable magnet 14 is located between the stators 12 and 13 as shown in FIG. 2(A), the two magnetic circuits A and B are formed in a symmetrical manner, so that magnetic flux passing through a hall element 11 located centrally becomes zero. When the moveable magnet 14 moves to the right as shown by FIG. 2(B), the balance between the magnetic circuits A and B breaks down and the hall element 11 becomes included in the magnetic circuit A. Changes in magnetic flux therebetween are then sensed and lengthwise movement of the slider 16 can be known. When the moveable magnet 14 moves to the left as shown by FIG. 2(C), the hall element 11 is included in magnetic circuit B and the position of the slider 16 can be detected from changes in magnetic flux therebetween.

The rotary sensor of FIG. 1 employs a toroidal permanent magnet. The output gradient is then set so that the output characteristic angle has a 180° cycle. However, only approximately 150° of the output characteristic angle is usable, with resolution falling accordingly when less than 150° is used.

On the other hand, with the linear sensor of FIGS. 2(A), 2(B) and 2(C), when the thickness of the moveable magnet 14 is made large, the distance between the stators 12 and 13, and the stator 15 becomes large, leakage of magnetic flux increases, and the linearity of the output value becomes poor. When the thickness t is made small in order to avoid this, magnetic force becomes weak and a desired sensitivity cannot be obtained.

SUMMARY OF THE INVENTION

Accordingly, it is the object of the present invention to provide a non-contact position sensor which is a rotary sensor and allows an arbitrary angle of usage to be set.

Moreover, it is an object of the present invention to provide a non-contact position sensor which is a linear sensor and allows a magnet to be made thick without increasing leakage of magnetic flux.

Additional objects and advantages of the invention will be set forth in part in the description which follows and, in part, will be obvious from the description, or may be learned by practice of the invention.

Objects of the present invention are achieved by providing a non-contact position sensor which includes a first stator having two magnet facing sides, a second stator having one magnet facing side aligned with the two magnet facing sides along a locus, a hall element provided between the first and second stators, and two magnets located next to each other along the direction of the locus opposite the three magnet facing sides so as to move freely along the locus.

A feature of the configuration as a linear sensor is that the magnets are plate-shaped magnets supported by a slider and the slider is retractable along a straight line locus. A further feature of the configuration as a rotary sensor is that the magnets are curved magnets supported by a rotor and the rotor is rotatable along an arced locus.

In the case of a linear sensor, a configuration may be adopted where the first and second stators are housed within a case, and a guide section maintaining a fixed distance between the magnets and the first and second stators, and a bearing supporting the slider in a freely retractable manner are formed within the case.

The guide section may have rails formed within the case and one or a plurality of rollers provided at the slider. The rollers may then be provided as a pair close to the centers of gravity of the two magnets in directions orthogonal to the direction of retraction of the slider.

In the case of a rotary sensor, the first and second stators are housed with the case, a guide pin is erected at the cover of the case so as to pass through and support the first stator, with the rotor being axially supported in a freely rotatable manner at the guide pin passing through the first stator.

Further, the first and second stators may be housed within a case, a hollow coupling section may be formed at the rotor, and a projection section fitting with the hollow coupling section of the rotor may be provided at the case.

With the linear and rotary sensors, width in a direction orthogonal to the locus of the first and second stators and width in a direction orthogonal to the locus of the moveable magnets may be substantially the same.

For a linear sensor where the two magnet facing sides of the first stator are located in a symmetrical manner at the sides of the one magnet facing side of the second stator, lengths of the magnet facing sides of the first stator are taken to be Sa1 and Sa2, a length of the magnet facing side of the second stator is taken to be Sa3, lengths of the two magnets are taken to be Ma1 and Ma2, a gap between the magnets is taken to be Ga1, gaps between the three magnet facing sides are taken to be Ga2 and Ga3, and a stroke of the magnets is taken to be 2L, a configuration where $$Ma1 = Ma2 = 2L - Ga1$$

$$Ga1 = Ga2 = Ga3$$

$$Sa1 = Sa2 = Sa3 = Ma1$$

will give optimum sensitivity.

Similarly, for a linear sensor where the two magnet facing sides of the first stator are located in a symmetrical manner at the sides of the one magnet facing side of the second stator, lengths of the magnet facing sides of the first stator are taken to be Sb1 and Sb2, a length of the magnet facing side of the second stator is taken to be Sb3, lengths of the two magnets are taken to be Mb1 and Mb2, a gap between the magnets is taken to be Gb1, gaps between the three magnet facing sides are taken to be Gb2 and Gb3, and a stroke of the magnets is taken to be 2L, a configuration where $$Mb1 = Mb2 = L - Gb1/2$$

$$Gb1 = Gb2 = Gb3$$

$$Sb1 = Sb2 = Sb3/2 = Mb1$$

will be the most compact.

With a rotary sensor, the two magnet facing sides of the first stator are located in a symmetrical manner at the sides of the one magnet facing side of the second stator, central angles of the two magnet facing sides of the first stator are taken to be $S\theta a1$ and $S\theta a2$, a central angle of the magnet facing side of the second stator is taken to be $S\theta a3$, central angles of the two magnets are taken to be $M\theta a1$ and $M\theta a2$, a gap between the magnets is taken to be $G\theta a1$, gaps between the three magnet facing sides are taken to be $G\theta a2$ and $G\theta a3$, and a stroke of the magnets is taken to be $2\theta$, and a configuration where $$M\theta a1 = M\theta a2 = 2\theta - G\theta a1$$

$$G\theta a1 = G\theta a2 = G\theta a3$$

$$S\theta a1 = S\theta a2 = S\theta a3 = M\theta a1$$

will give optimum sensitivity.

Further, when two magnet facing sides of the first stator are located in a symmetrical manner at the sides of the one magnet facing side of the second stator, central angles of the two magnet facing sides of the first stator are taken to be $S\theta b1$ and $S\theta b2$, a central angle of the magnet facing side of the second stator is taken to be $S\theta b3$, central angles of the two magnets are taken to be $M\theta b1$ and $M\theta b2$, a gap between the magnets is taken to be $G\theta b1$, gaps between the three magnet facing sides are taken to be $G\theta b2$ and $G\theta b3$, and a stroke of the magnets is taken to be $2\theta$, a configuration where $$M\theta b1 = M\theta b2 = \theta - G\theta b1/2$$

$$G\theta b1 = G\theta b2 = G\theta b3$$

$$S\theta b1 = S\theta b2 = S\theta b3/2 = M\theta b1$$

will be the most compact.

Further, it is preferable for the intervening gap into which the hall element between the first stator and second stator is inserted to be substantially the same as the gap between the magnets and the gaps between the three magnet facing sides.

Objects of the present invention are also achieved by providing a non-contact rotary position sensor having an output characteristic angle with a cycle settable greater than 180°.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5(A) is a cross-sectional view of the center of a sensor, and FIG. 5(B) is a cross-sectional drawing along V(B)—V(B) of FIG. 5(A).

FIG. 7(A) is a cross-sectional view of a central part, FIG. 7(B) is a cross-sectional view along VII(B)—VII(B) of FIG. 7(A), and FIG. 7(C) is a view from VII(C)—VII(C) of FIG. 7(A).

FIGS. 26(A), 26(B) and 26(C) are views showing generating conditions for a magnetic circuit of a rotary sensor that bring about optimum sensitivity.

DESCRIPTION OF THE PREFERRED EMBODIMENTS

Figure 1:
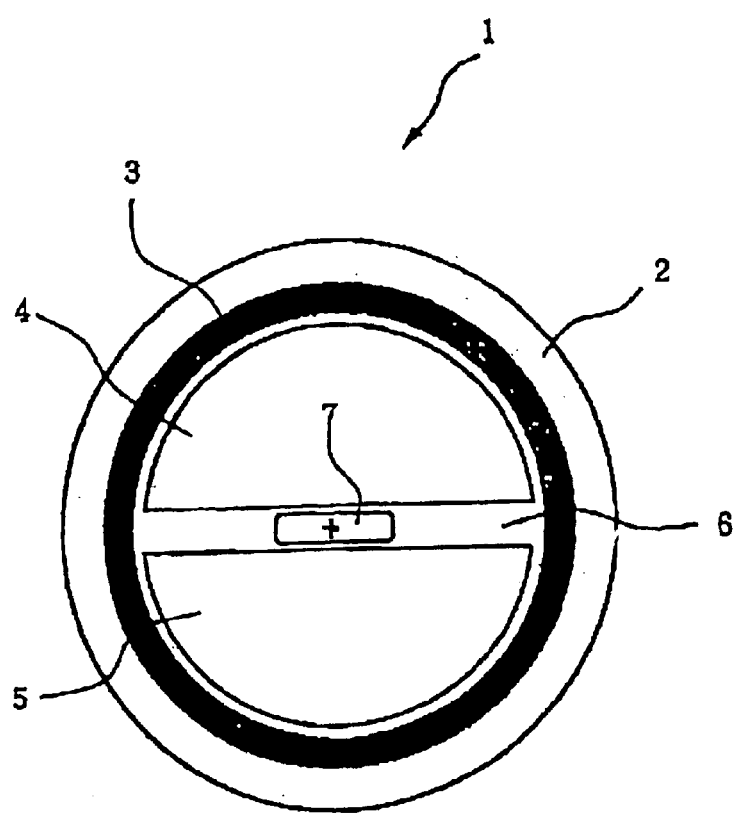
FIG. 1 (prior art) is a view showing a configuration for a rotary sensor.
Figures 2A, 2B, 2C:
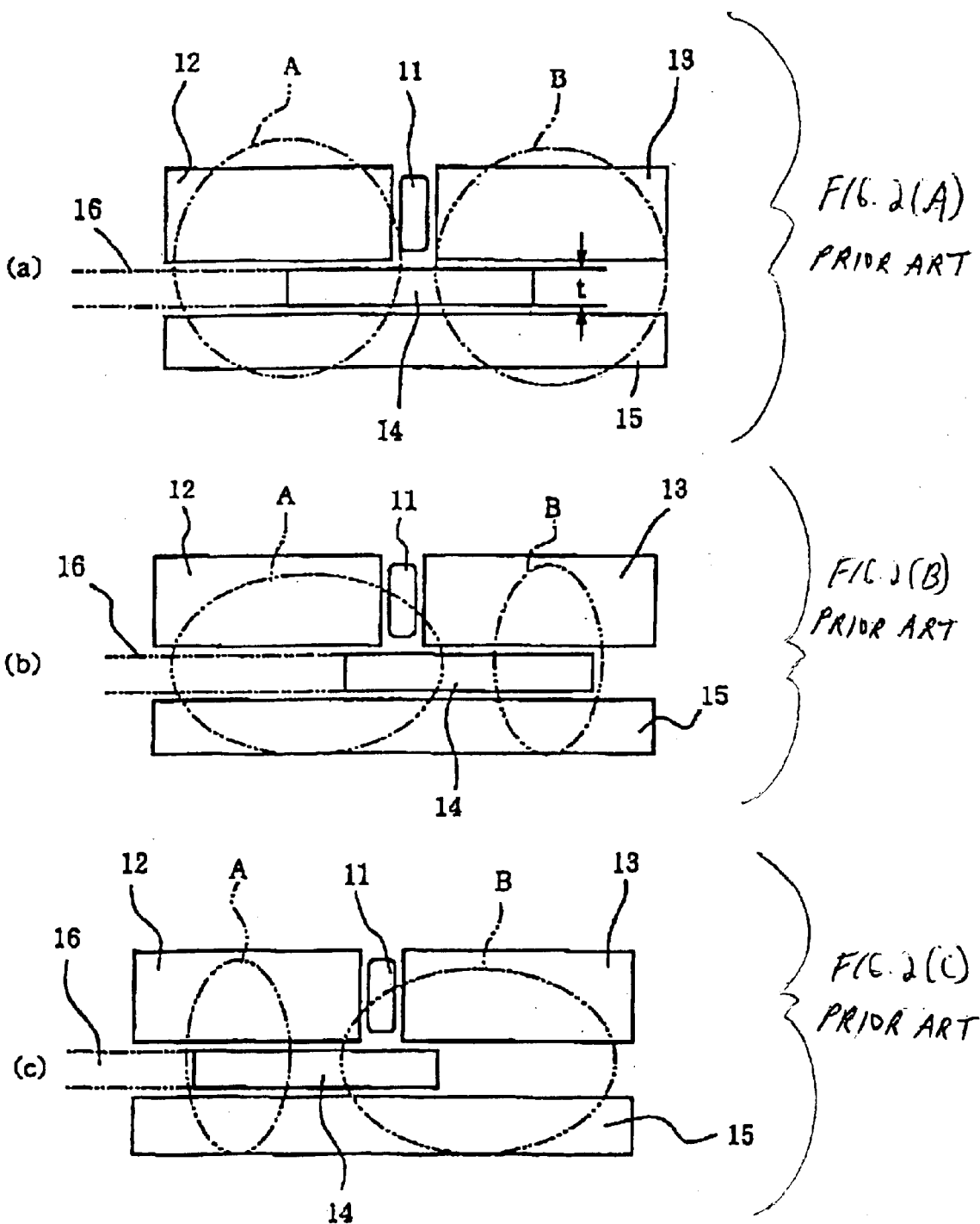
FIGS. 2(A), 2(B) and 2(C) (prior art) are views showing a configuration for a linear sensor.

Reference will now be made in detail to a present preferred embodiment of the present invention, examples of which are illustrated in the accompanying drawings, wherein like reference numerals refer to elements throughout.

Figure 3A:
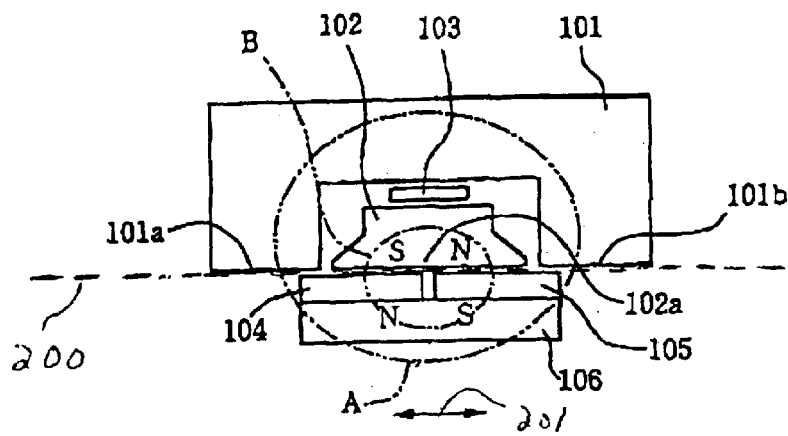
FIGS. 3(A), 3(B) and 3(C) are views showing a configuration for a non-contact position sensor of the present invention when applied to a linear sensor.
Figure 3B:
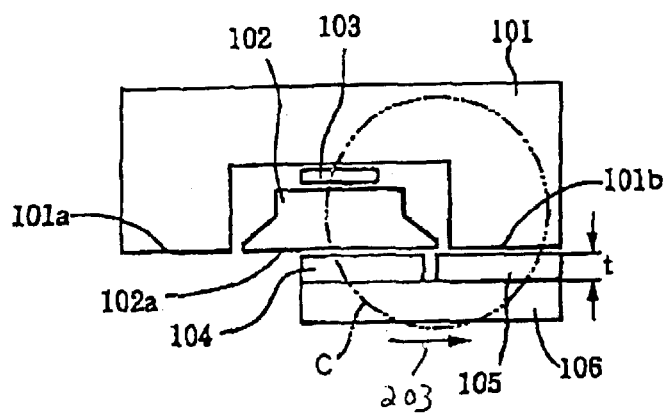
Figure 3C:
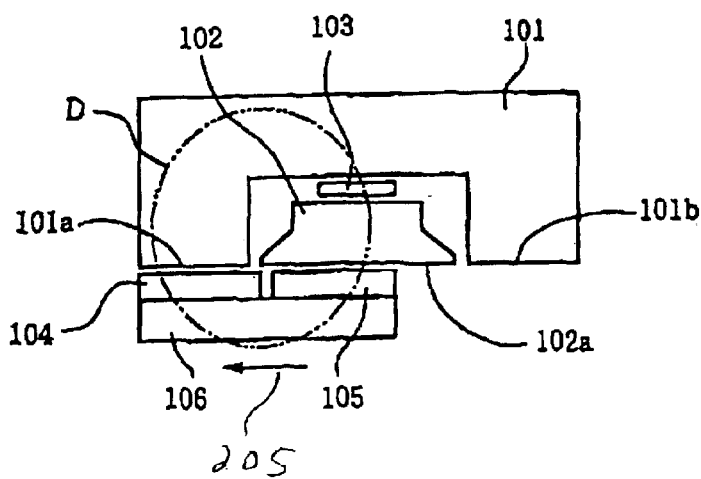

FIGS. 3(A), 3(B) and 3(C) are views showing a configuration for a linear sensor as a non-contact position sensor, according to an embodiment of the present invention. The sensor includes a first stator 101, a second stator 102, a hall element 103 located between the first stator 101 and the second stator 102, moveable magnets 104 and 105 located facing the first stator 101 and the second stator 102, and a slider 106 joining the moveable magnets. The first stator 101 is reverse-C-shaped and has magnet facing sides 101a and 101b on both sides, the second stator 102 has just one magnet facing side 102a, and these three magnet facing sides 101a, 101b and 102a are arranged along a straight line locus 200. In this embodiment, locus 200 is a straight line. However, the present invention is not limited to the locus being a straight line.

Moreover, as can be seen from FIGS. 3(A), 3(B) and 3(C), movable magnets 104 and 105 are located next to each other along locus 200 opposite magnet facing sides 101a, 101b and 102a.

The arrangement of the first and second stators 101 and 102, and the hall element 103 is in the form of, for example, symmetrical mirror finished surfaces. As shown by arrow symbols 201, the slider 106 is retractable in a longitudinal direction, with the extent of this movement being detected by the sensor.

The moveable magnets 104 and 105 are, for example, plate-shaped magnets of the same length arranged with a slight gap therebetween, with N and S magnetic poles formed along the direction of thickness, with the moveable magnets 104 and 105 being arranged as shown in the drawings in such a manner that the magnetic poles oppose each other. The arrangement of the magnetic poles is also the same for further embodiments disclosed in the following.

As shown in FIG. 3(A), when the moveable magnets 104 and 105 are exactly at the center, a magnetic circuit A is formed by the moveable magnets 104 and 105 and the first stator 101, a magnetic circuit B is formed by the moveable magnets 104 and 105, and the second stator 102, and the magnetic flux passing through the hall element 103 is zero.

As shown in FIG. 3(B), when the moveable magnets 104 and 105 move to the right end by moving in the direction of arrow 203, a magnetic circuit C is formed by the moveable magnets and the first and second stators 101 and 102, and magnetic flux passes through the hall element 103. The magnetic flux passing through the hall element 103 gradually increases from zero as the moveable magnets move from the position in FIG. 3(A) to the right, and reaches a maximum in FIG. 3(B). A voltage corresponding to changes in magnetic flux is outputted and the position of the moveable magnet, i.e. the position of the slider 106, can be detected.

As shown in FIG. 3(C), when the moveable magnets 104 and 105 move to the left end by moving in the direction of arrow 205, a magnetic circuit D deviating towards the left side of the first status 101 is formed. The direction of this magnetic flux is the opposite direction to that of the magnetic circuit C. Therefore, if movement of the slider 106 in the right direction is taken to be positive, then movement in the left direction in FIG. 3(C) can be detected as being negative.

The non-contact position sensor of FIGS. 3(A), 3(B) and 3(C) has the following characteristics.
① The magnetic circuit has a closed-loop configuration and there is therefore no leakage of magnetic flux.
② There is little fluctuation in output because it is difficult for the slider 106 to deviate in a direction at right angles to the direction of movement due to the magnetic force.
③ There is no leakage of magnetic flux even if the thickness t of the moveable magnets 104 and 105 is large.
④ The slider 106 is difficult to move even if subjected to vibration because the slider 106 is usually drawn towards the sides of the first and second stators 101 and 102.

Figure 4:
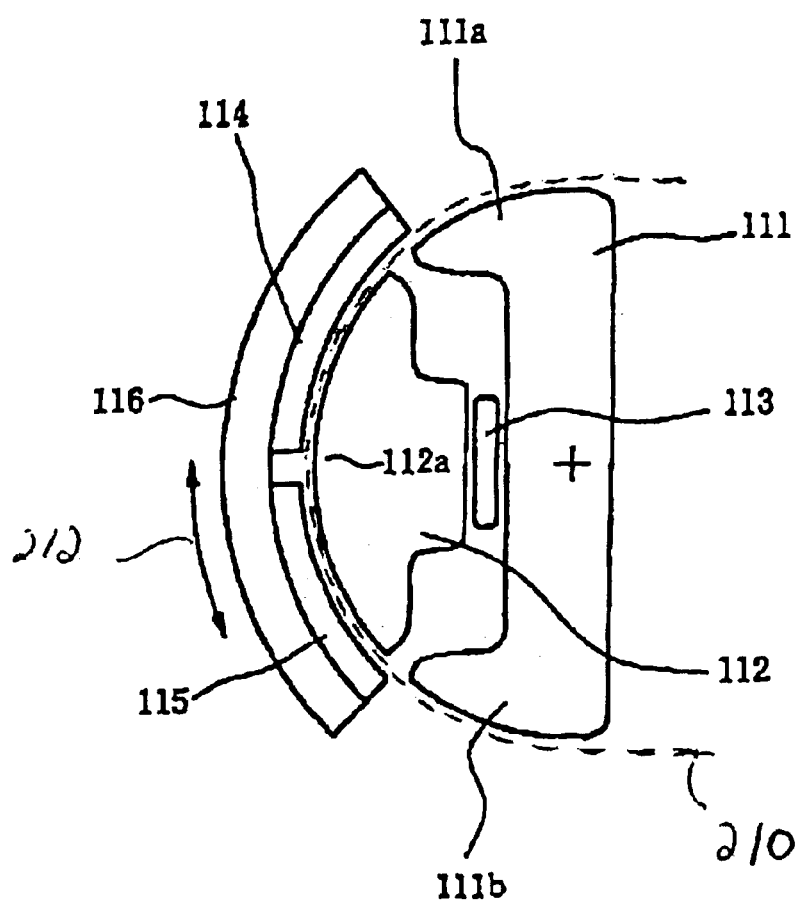
FIG. 4 is a view showing a configuration for a non-contact position sensor of the present invention when applied to an angle, or rotary, sensor.

FIG. 4 is a view showing an embodiment of a non-contact position sensor of FIGS. 3(A), 3(B) and 3(C) when applied to an angle, or rotary, sensor. This non-contact position sensor comprises a first stator 111 equipped with two magnet facing sides 111a and 111b, a second stator 112 equipped with one magnet facing side 112a, a hall element 113 located between the first stator 111 and the second stator 112, moveable magnets 114 and 115, and a rotor 116 for fixing the moveable magnets 114 and 115.

The three magnet facing sides 111a, 111b and 112a are located on the same arc, or locus 210, so as to collectively constitute what is substantially a semi-circle. On the other hand, the moveable magnets 114 and 115 are plate-shaped magnets having centers of curvatures that are the same as that of the locus 210 of the magnet facing sides 111a, 111b and 112a, and are located along the locus 210. The rotor 116 then rotates along locus 210 as shown by the arrow 212. Although FIG. 4 shows locus 210 as being an arc, or semi-circle, the present invention is not limited to locus 210 being an arc or semi-semi-circle.

In this embodiment, when the moveable magnets 114 and 115 move along the locus 210, magnetic circuits corresponding to magnetic circuits A, B, C and D in FIGS. 3(A), 3(B) and 3(C) are formed, the magnetic flux passing through the hall element 113 changes, and the angle of rotation of the rotor 116 can be detected by detecting this change.

Figure 5B:
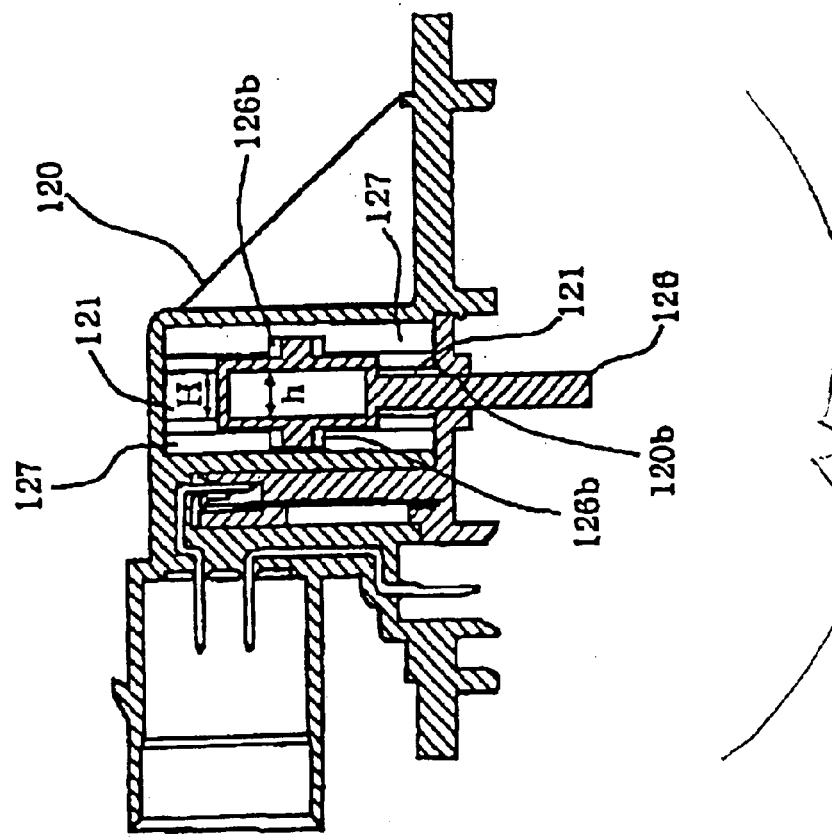
FIGS. 5(A) and 5(B) are assembly drawings of a non-contact position sensor applied to a linear sensor, where
Figure 5A:
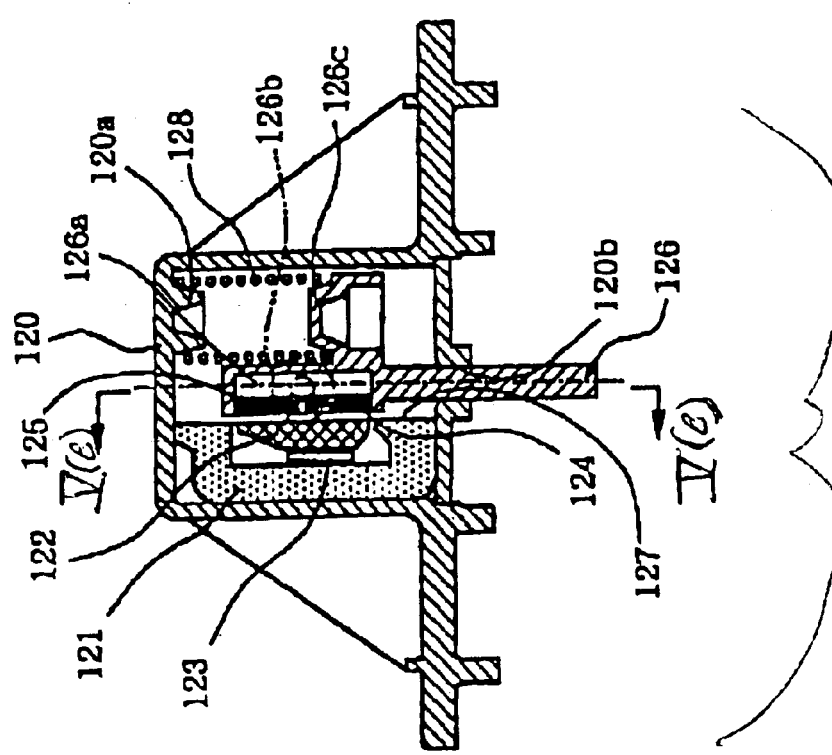

FIGS. 5(A) and 5(B) are assembly drawings of a non-contact position sensor applied to a linear sensor of the present invention, where FIG. 5(A) is a cross-sectional view of the center of a sensor, and FIG. 5(B) is a cross-sectional drawing along V(B)—V(B) of FIG. 5(A). In these drawings, the first stator 121 and the second stator 122 are housed within a space within the sensor case 120, with a hall element 123 being located between the first and second stators 121 and 122. The moveable magnets 124 and 125 are affixed to a third stator 126a within the slider 126 and are housed in such a manner as to face the first and second stators 121 and 122.

Rollers 126b are provided at both sides of the slider 126 and can roll freely on a rail 127 formed within the case 120. Further, a spring bearing 126c is provided on the opposite side to the side facing the stator of the slider 126. A coil spring 128 is also fitted with the spring bearing 120a formed within the case 120 so as to normally urge the slider 126 in a downward direction as shown in the drawings.

With the above configuration, the slider 126 is supported at a bearing 120b of the case 120 so that when the moveable magnets 124 and 125 are drawn towards the first and second stators 121 and 122, the rollers 126b comes into contact with the rail 127 so that the stators 121 and 122 cannot come any closer. The rollers 126b are provided near the center of gravity of the moveable magnets 124 and 125 and the third stator 126a and may therefore provide stable support to both the left and right when provided as a pair. Other configurations, such as providing pairs of rollers at the upper and lower ends of the moveable magnets 124 and 125 so as to give a total of four magnets, are also possible. Further, even if there is looseness between a bearing 120b and a slider 126, there is no hindrance due to the support of the rollers 126b and the rail 127.

The slider is drawn towards the center of the stators by the moveable magnets 124 and 125 and therefore does not shift in a direction orthogonal to the direction of attraction of the moveable magnets 124 and 125. However, it would typically be preferable for a width H in a direction orthogonal to the direction of movement of the first and second stators 121 and 122 and a width h in the same direction for the moveable magnets 124 and 125 to be substantially the same.

In this manner, in the present embodiment of the present invention, the slider 126 is supported by a pair of or a plurality of rollers 126b and a rail 127 in addition to the bearing 120b. The slider is therefore supported in a stable manner even if dimensional errors etc. occur, to enable smooth sliding. Moreover, even if vibrations are received from outside and a load is incurred at the slider and the moveable magnets, this load is barely applied to the bearing 120b of the slider, and there is therefore little bearing friction. Further, as support is provided by a pair of rollers 126b and a bearing 120b, there is only minimal mechanical hysterisis and therefore minimal output hysterisis during operation.

Figure 6:
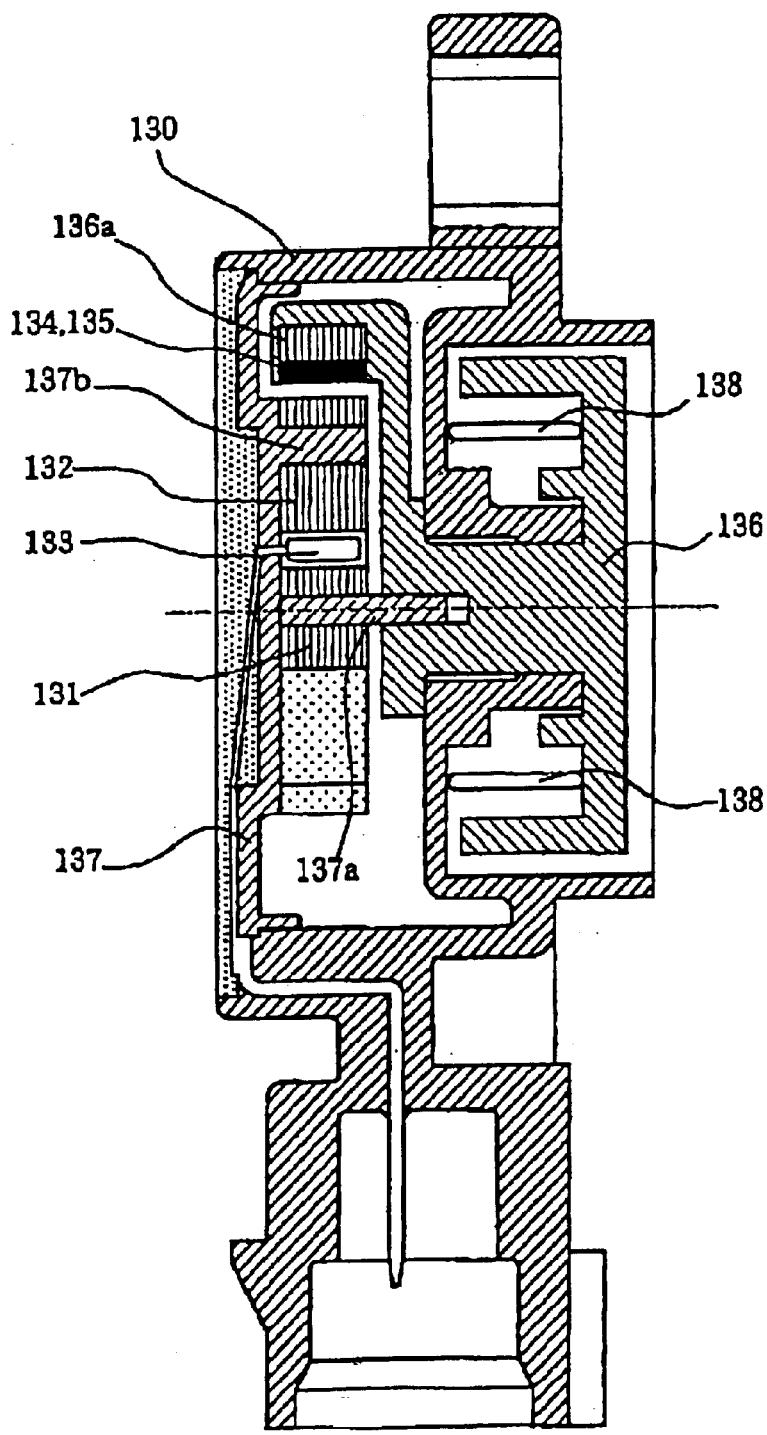
FIG. 6 is an assembly view of a non-contact position sensor of the present invention when applied to an actual rotary sensor.

FIG. 6 is an assembly view of a non-contact position sensor of the present invention when applied to an actual rotary sensor. In FIG. 6, the first stator 131 and the second stator 132 are provided within the case 130, with a hall element 133 being inserted between the first stator 131 and the second stator 132.

The space within the case 130 into which these items fit is sealed by a cover 137, with a guide pin 137a for supporting a rotor 136 in a freely rotatable manner and a pin 137b for fixing the second stator 132 being provided at this cover 137. The guide pin 137a passes through and supports the first stator 131, with the end that passes through fitting with the rotor 136 in such a manner that the rotor 136 is freely rotatable. The second stator 132 is fitted so as to be fixed to another pin 137b. Further, a spirally wound spring 138 is fitted into a space between the rotor 136 and the case 130, with the rotor 136 normally providing urging force so as to provide rotation in one direction taking the guide pin 137a as an axis. Although not shown in the drawings, a stopper can be provided to stop rotation of the rotor 136 at a prescribed position.

Part of the rotor 136 is provided so as to extend to a position facing the second stator 132, with the third stator 136a being fitted at this location. The two arc-shaped moveable magnets 134 and 135 are located at the third stator along a single arc.

The positional relationship of the first and second stators, the moveable magnets and the rotor is basically the same as shown in FIG. 4.

As a result of the above configuration, the moveable magnets 134 and 135 rotate centered about the guide pin 137a, so as to move along an arc formed by the magnet facing sides of the first and second stators 131 and 132.

Looseness is provided at the engaging portion of the guide pin 137a and the rotor 136. Therefore, when drifting occurs in the direction of attraction of the magnets at the moveable magnets 134 and 135, there is attraction between the moveable magnets 134 and 135 and the first and second stators 131 and 132. The looseness therefore tends to one side, there is little influence on the output precision, there is almost no operation hysterisis, and there is therefore no influence on the operation.

When shifting of the rotor 136 occurs in a direction at right angles to the direction of attraction, this will become a shift in the direction of thrust of the guide pin 137a. However, control is exerted in such a manner that the phases of the moveable magnets 134 and 135 and the first and second stators 131 and 132 are controlled to coincide, so that looseness in the thrust direction can also be absorbed.

Figure 7:
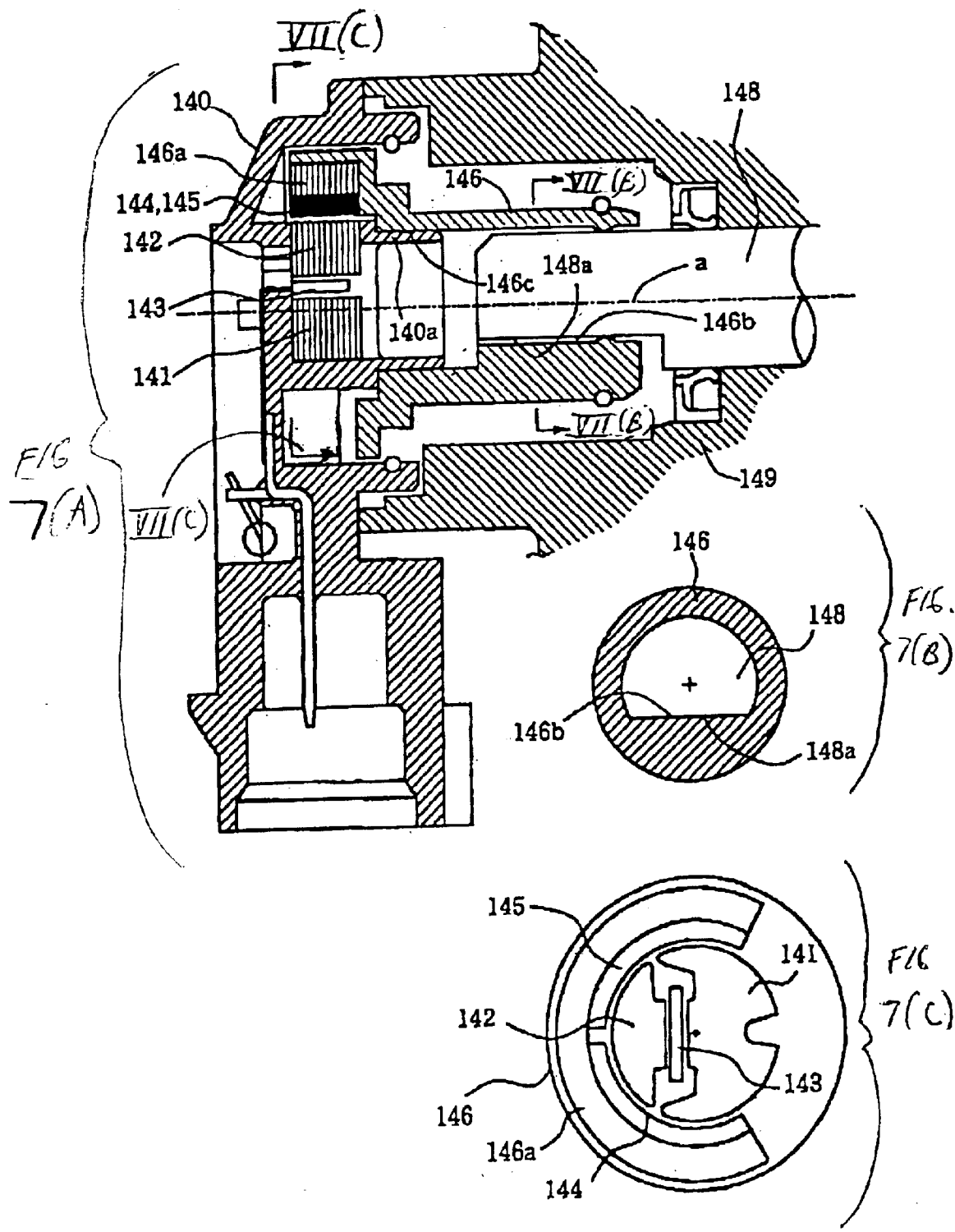
FIGS. 7(A), 7(B) and 7(C) are views showing a farther embodiment of a rotary sensor, where

FIGS. 7(A), 7(C) and 7(C) show an embodiment of the same rotary sensor as in FIG. 4, but in this embodiment a guide pin is not employed. FIG. 7(A) is a central cross-sectional view, FIG. 7(B) is a cross-sectional view taken along VII(B)—VII(B) of FIG. 7(A), and FIG. 7(C) is a view corresponding to FIG. 4, as viewed from VII(C)—VII(C) of FIG. 7(A).

The first stator 141 and the second stator 142 are arranged within the case 140 along an arc, with a hall element 143 located therebetween, and the moveable magnets 144 and 145, and the third stator 146a are arranged on the outside. The moveable magnets 144 and 145 and the third stator 146a are fixed to the rotor 146 and are able to rotate freely due to rotation of the rotor 146 via a gap slightly to the outside of the arc of the first and second stators 141 and 142.

A hollow coupling section 146c formed at one side of the rotor 146 fits with a case projection section 140a so as to be supported at the case 140 in a freely rotatable manner, while the other side is supported by a shaft 148 projecting from a body 149 to which the rotary sensor is mounted. As shown in FIG. 7(B), a notch 148a is provided at the tip of the shaft 148 and overlaps with the notch 146b formed at the rotor 146 so as to stop when twisted.

When the shaft 148 rotates taking the axis as the center of rotation, the moveable magnets 144 and 145 move along the arc and the flux passing through the hall element 143 changes, so that the angle of rotation of the shaft 148 can be measured.

When play in the direction of attraction of the moveable magnets 144 and 145 occurs at the engaging section of the rotor 146, the moveable magnets 144 and 145 attract the first and second stators 141 and 142 and the looseness is absorbed as a result of the approach of one side.

When shifting of the rotor 146 occurs in a direction at right angles to the direction of attraction, this is a shift in the direction of the axis a. Therefore, control is exerted in such a manner that the phases of the moveable magnets 144 and 145 and the first and second stators 141 and 142 are controlled to coincide (so that the centers coincide), so that deviation in the thrust direction can also be absorbed.

However, the influence on output precision due to this shifting and play is small and there is almost no operation hysterisis.

Namely, as described above, the rotor is normally automatically returned to a fixed position even when subjected to external force due to vibrations between the rotor and the moveable magnet and it is therefore difficult for the vibrations to exert any influence. There is also little wear because the influence of the vibrations is not applied to the bearing of the rotor.

Figure 8:
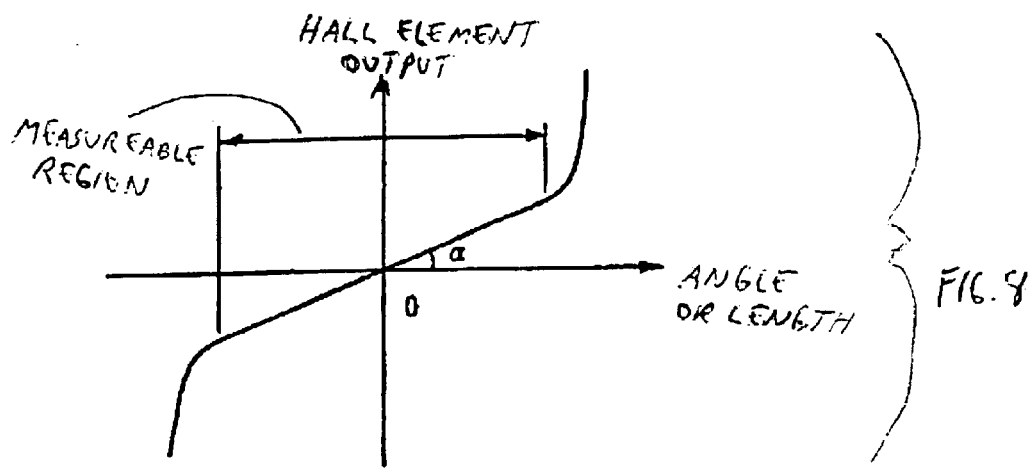
FIG. 8 is a graph showing the relationship between the amount of displacement of a non-contact position sensor of the present invention and output.

FIG. 8 is a graph showing the relationship between the amount of displacement of the non-contact position sensor of the present invention and output. The vertical axis shows output for the hall element and the horizontal axis shows the length of movement in the case of a linear sensor, and the angle in the case of a rotary sensor. The non-contact position sensor of the present invention is formed in a symmetrical shape so that within a certain range from the center, there is a linear relationship between the displacement in magnetic force and the change in angle or length, as shown in FIG. 8. This linear portion then constitutes a measurable region. For an actual sensor, design is performed so that the displacement of angle and length falls in the vicinity of the center of this straight-line portion and at this time the gradient of the straight line expresses the sensitivity of the sensor. Typically, when the moveable magnet is made long, the sensitivity improves but this is not effective because it is also necessary to make the shape of the stators larger in line with the moveable magnets.

Figure 9:
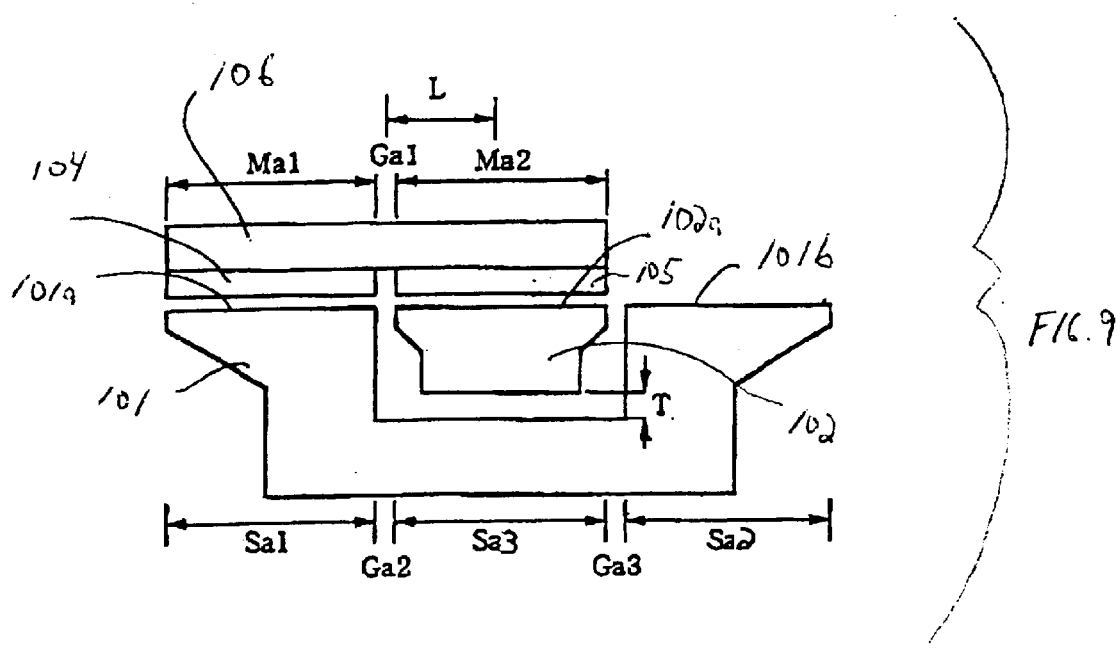
FIG. 9 is a view showing an embodiment of a linear non-contact position sensor of the present invention for which sensitivity is very sensitive.

FIG. 9 shows an embodiment of a linear non-contact position sensor of the present invention for which sensitivity is most sensitive. More specifically, FIG. 9 is an embodiment showing the relationship between the dimensions and position of the stators and the moveable magnets for giving optimum sensitivity. The basic configuration is the same as that disclosed in FIGS. 3(A), 3(B) and 3(C), but the magnet facing sides and the moveable magnets are long.

Lengths of the two magnet facing sides of the first stator are taken to be Sa1 and Sa2, a length of the magnet facing side of the second stator is taken to be Sa3, and lengths of the two moveable magnets are taken to be Ma1 and Ma2. A gap between the moveable magnets is taken to be Ga1 and gaps between the three magnet facing sides lined up along a straight line are taken to be Ga2 and Ga3. The stroke of the moveable magnets is taken to be L to each side from the center, giving a total of 2L.

Figures 10A, 10B, 10C:
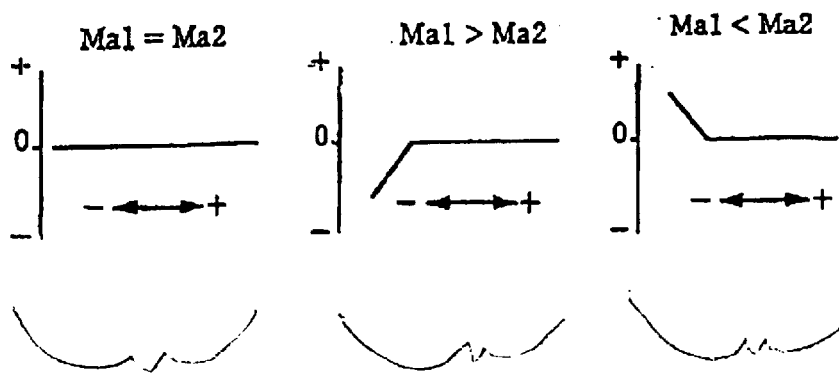
FIGS. 10(A), 10(B) and 10(C) are graphs showing the relationship between magnet length and linearity.

The following is a description of the relationship between the dimensions and position of each part for giving optimum sensitivity. First, regarding the relationship between the lengths Ma1 and Ma2 of the moveable magnets, as shown in FIGS. 10(A), 10(B) and 10(C), in the vicinity of Ma1=Ma2 is preferable, i.e. a straight line characteristic is maintained with a linearity of zero when Ma1=Ma2 in FIG. 10(A). However, linearity between the amount of displacement and voltage is poor when Ma1>Ma2 as shown in FIG. 10(B), or when Ma1<Ma2 as shown in FIG. 10(C).

Figure 11:
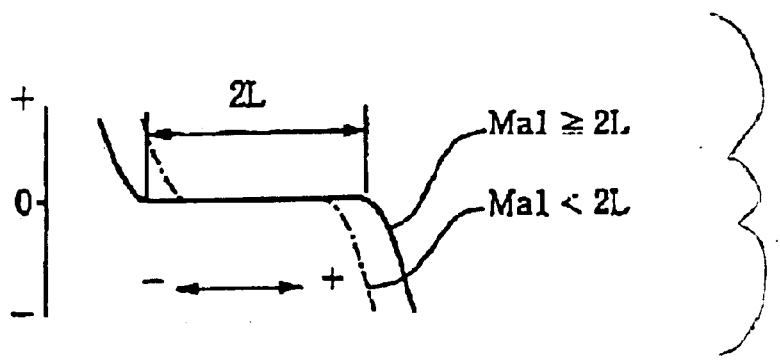
FIG. 11 is a graph showing how sensor stroke length L and magnet length Ma1 influence linearity of sensitivity.

Next, with regards to the relationship between the length Ma1 and the stroke L of the moveable magnet, a length in the vicinity of Ma1=2L is preferable, with a length in the vicinity of Ma1=2L−Ga1 being particularly efficient. Further, when Ma1<2L, as shown by the dotted and dashed line in FIG. 11, linearity is poor within the stroke 2L. When Ma1>2L, there is no influence on linearity but there is unnecessary length with regards to the operation stroke, which is of little use.

Figure 12A:
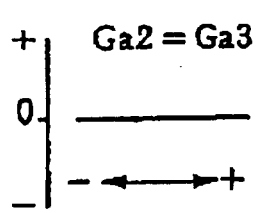
FIGS. 12(A), 12(B) and 12(C) are graphs showing the relationship between gaps Ga2 and Ga3, and linearity.
Figure 12B:
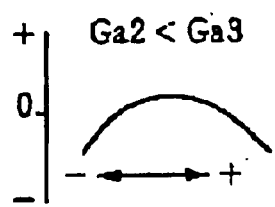
Figure 12C:
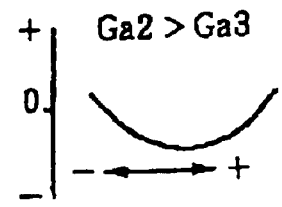

FIGS. 12(A), 12(B) and 12(C) are graphs showing the relationship between clearances Ga2 and Ga3 and linearity As shown in FIG. 12(A), linearity is good in the vicinity of Ga2=Ga3, but linearity is poor when Ga2<Ga3 or when Ga2>Ga3 as shown in FIG. 12(B) and FIG. 12(C).

Next, regarding the relationship between the clearance T of the first and second stators into which the hall element is inserted and Ga2 and Ga3, linearity is good when T<Ga2=Ga3, and efficiency is particularly good in the vicinity of T=Ga2=Ga3. When T>Ga2=Ga3, a magnetic flux short cut arises, and linearity is poor as shown in FIG. 13(B).

Figure 14A:
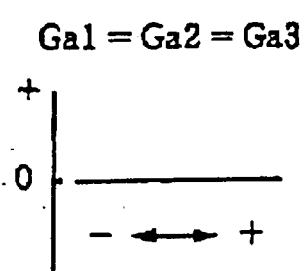
FIGS. 14(A), 14(B) and 14(C) are graphs showing the relationship between gaps Ga1, Ga2 and Ga3, and linearity.

Regarding the relationship between the three clearances Ga1, Ga2 and Ga3, as shown in FIG. 14(A), in the vicinity of Ga1=Ga2=Ga3 linearity is good. When Ga1>Ga2=Ga3, there is the tendency shown in FIG. 14(B), and Ga1<Ga2=Ga3 is as shown in FIG. 14(C), with linearity being poor in either case.

Figure 15A:
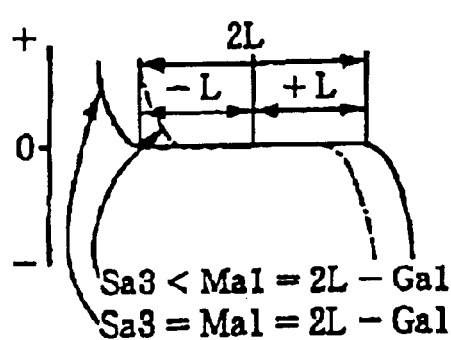
FIGS. 15(A) and 15(B) are graphs showing the relationship between the lengths of magnet facing sides of the second stator and length Ma1 of a variable magnet.
Figure 15B:
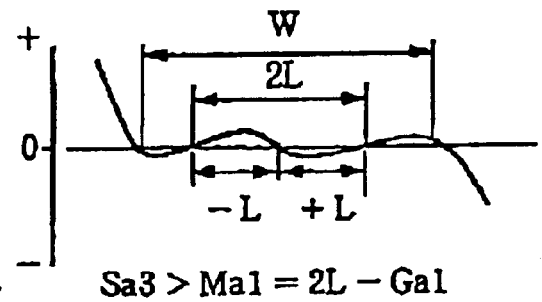

The relationship between the length Sa3 of the second stator and the length Ma1 of the moveable magnet is as shown in FIG. 15(A) and FIG. 15(B). When Sa3<Ma1=2L−Ga1, linearity is poor within the range of the stroke 2L as shown by the dotted-and-dashed line of FIG. 15(A). The measurable range W is broadened to 2L or more as shown in FIG. 15(B) when Sa3>Ma1=2L−Ga1, but linearity is poor.

Therefore, in the vicinity of Sa3=Ma1=2L−Ga1 is most appropriate.

Figure 16:
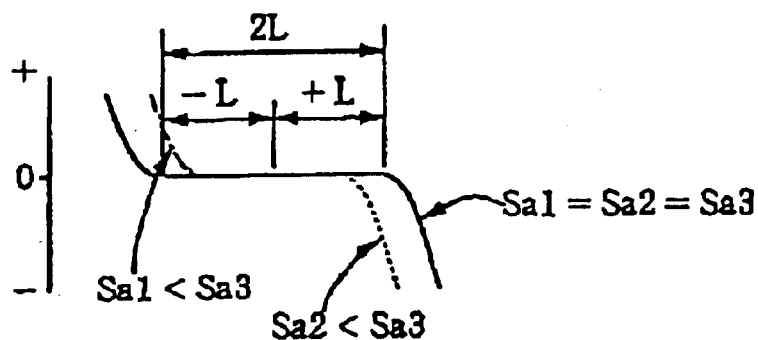
FIG. 16 is a graph showing the relationship between lengths Sa1, Sa2 and Sa3 of facing sides and a stroke length L.

The relationship between the lengths Sa1 and Sa2 of the magnet facing sides of the first stator, the length Sa3 of the magnet facing side of the second stator, and the stroke 2L is as shown in FIG. 16. The solid line in FIG. 16 shows the case where Sa1=Sa2=Sa3, with linearity being good within the entire range of 2L. With regards to this, when Sa1<Sa3, linearity is poor on the side −L, and linearity is poor at the side +L when Sa2<Sa3.

From the above, the sensor conditions giving optimum sensitivity are, taking the stroke to be 2L, that the following are to be substantially fulfilled:

① Regarding the lengths Ma1 and Ma2 of the two variable magnets, taking the gap between the variable magnets to be Ga1, Ma1=Ma2=2L−Ga1

② The length of the second stator Sa3=Ma1=2L−Ga1

③ First stator length Sa3×3+Ga2×2 (Sa1=Sa2=Sa3) ≧6L−Ga1

④ Gap width Ga1=Ga2=Ga3

Figure 17:
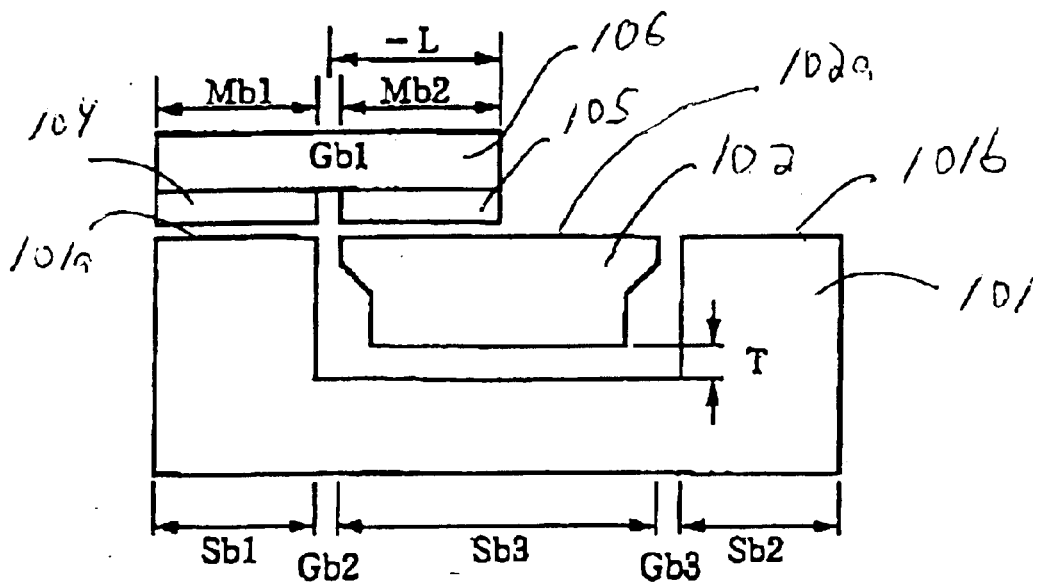
FIG. 17 is a view showing an embodiment of a linear non-contact position sensor of the present invention which is the most compact.

FIG. 17 is a view showing the configuration of a linear non-contact position sensor that can be made the most compact. The basic configuration is the same as that disclosed in FIG. 9, but the length of the magnet facing sides and the length of the moveable magnets are different.

Lengths of the two magnet facing sides of the first stator are taken to be Sb1 and Sb2, a length of the magnet facing side of the second stator is taken to be Sb3, and lengths of the two moveable magnets are taken to be Mb1 and Mb2. A gap between the moveable magnets is taken to be Gb1 and gaps between the three magnet facing sides lined up along a straight line are taken to be Gb2 and Gb3. The stroke of the moveable magnets is taken to be L to each side from the center, giving a total of 2L.

In the following, a description is given with regards to the relation of the dimension and position of each of the parts to make the assembly as compact as possible from the point of view of the relationship between the length of the moveable magnet and the linearity.

Figure 18:
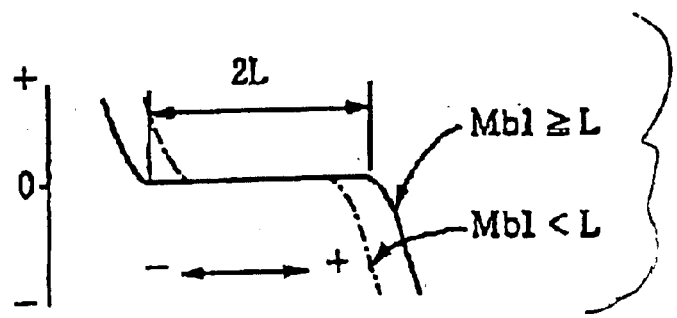
FIG. 18 is a graph showing the relationship between a length Mb1 of a moveable magnet and a stroke length L.

As shown in FIG. 18, it is preferable for the lengths Mb1 and Mb2 of the moveable magnets to be in the vicinity of Mb1=Mb2. Efficiency is good in the vicinity of Mb1=Mb2= L, and is particularly good in the vicinity of Mb1=Mb2=L−(Gb1/2). Linearity of magnetic force is poor in the range of operating stroke 2L as shown in FIG. 18 when Mb1<L. When Mb1>L, this length is unnecessary with regards to the operating stroke and is therefore not of any use.

Figure 19A:
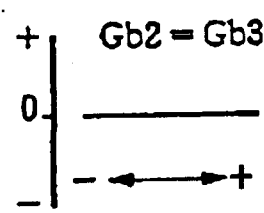
FIGS. 19(A), 19(B) and 19(C) are graphs showing the relationship between gaps Gb2 and Gb3.
Figure 19B:
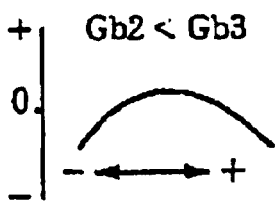
Figure 19C:
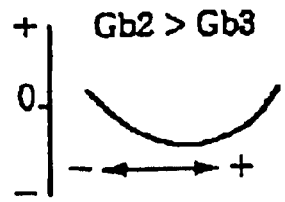

FIGS. 19(A), 19(B) and 19(C) show relationships of the gaps Gb2 and Gb3. In FIG. 19(A), linearity is good when Gb2=Gb3, and is best in the vicinity of Gb1=Gb2=Gb3. Linearity is poor in the case in FIG. 19(B) where Gb2<Gb3, and in FIG. 19(C) where Gb2>Gb3.

Figure 13A:
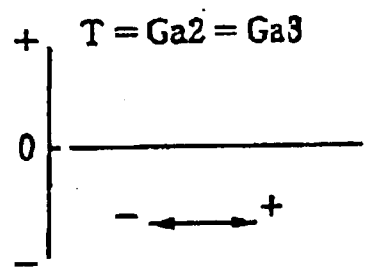
FIGS. 13(A) and 13(B) are graphs showing the relationship between a gap T between first and second stators and gaps Ga2 and Ga3.
Figure 13B:
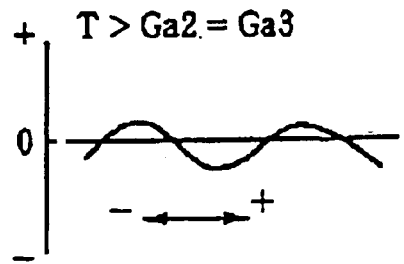

Regarding the relationship between the clearance T of the first and second stators between which the hall element is inserted and Gb2 and Gb3, the vicinity where T<Gb2=Gb3 is appropriate for the same reasons as described for FIGS. 13(A) and 13(B).

Figure 14B:
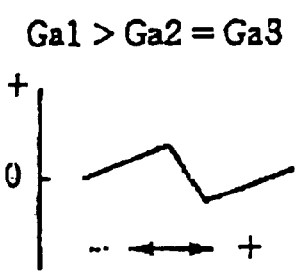
Figure 14C:
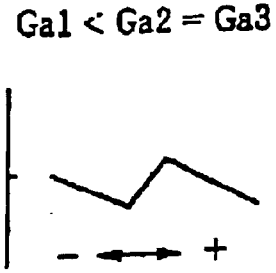

Regarding the gaps, linearity is optimal in the vicinity of Gb1=Gb2=Gb3 for the same reasons as described for FIGS. 14(A), 14(B) and 14(C).

Figure 20A:
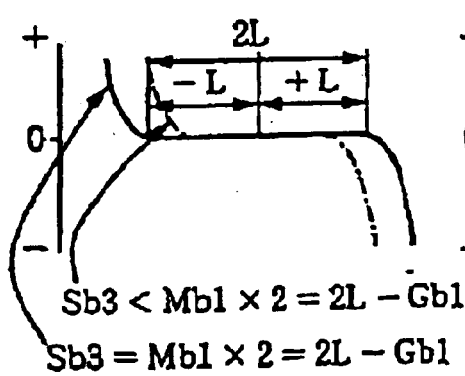
FIGS. 20(A) and 20(B) are graphs showing the relationship between a length Sb3 of a second stator, a length Mb1 of a moveable magnet and a stroke length L.
Figure 20B:
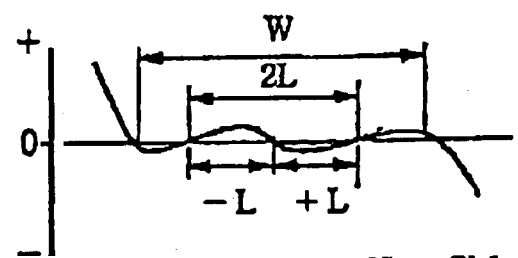

FIGS. 20(A) and 20(B) are graphs showing the relationship between a length Sb3 of a second stator, a length Mb1 of a moveable magnet and a stroke length L. The solid line of FIG. 18(A) is for when Sb3=Mb1×2=L−Gb1, and linearity is maintained for the whole of the operating length 2L. However, when Sb3<Mb1×2=2L−Gb1, linearity is poor at both ends of 2L, as shown by the dotted-and-dashed line. The measuring range W can be broadened when Sb3>Mb1×2=2L−Gb1 as shown in FIG. 20(B) but linearity becomes poor.

Figure 21:
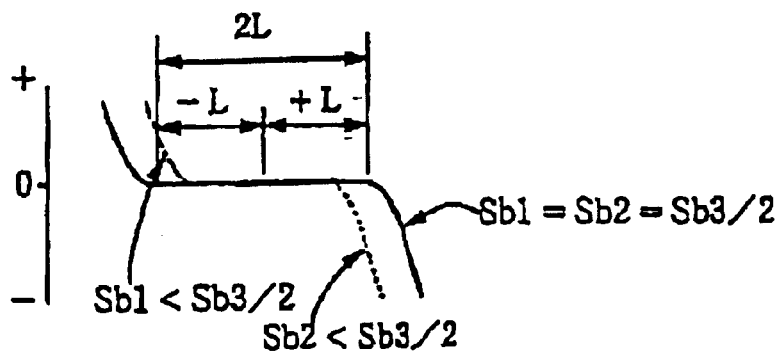
FIG. 21 is a graph showing the relationship between the sizes of magnet facing sides Sb1, Sb2 and Sb3.

The length of the magnet facing sides Sb1, Sb2, Sb3 are at their most efficient when Sb1=Sb2=Sb3/2, as shown by the solid line in FIG. 21. Linearity is therefore good when the length of the first stator is Sb3×2+Gb2×2, and is poor when Sb1<Sb3/2, or when Sb2<Sb3/2, as shown by the dotted-and-dashed line and dotted line in FIG. 21. Sb1=Sb2>Sb3/2 also provides good linearity but unfortunately makes the overall length long, and is incompatible with compactness.

The length of the first stator is therefore;

first stator length≧2(2L−Gb1)+Gb1×2≧4L

From the above, the following relationships are to be fulfilled, taking the stroke to be 2L, to give a linear sensor of optimum compactness;
① Regarding the lengths Mb1 and Mb2 of the two variable magnets, taking the gap between the variable magnets to be Gb1, Mb1=Mb2=2L−Gb1/2.
② The length of the second stator Sb3=2Mb1=2L−Gb1
③ First stator length Sb3×2+Gb2×2 (Sb1=Sb2=Sb3/2) ≧4L
④ The width of the gap is Gb1=Gb2=Gb3.

With regards to the same stroke L, the length of the first stator is approximately 6L−Ga1 for the linear sensor in FIG. 9, and is approximately 4L for the linear sensor in FIG. 17. Therefore, the linear sensor of FIG. 9 is approximately 50% longer than the linear sensor in FIG. 17.

The linear sensor of FIG. 9 is approximately twice as sensitive as the linear sensor of FIG. 17. This is described using FIGS. 22(A), 22(B) and 22(C), and FIGS. 23(A), 23(B) and 23(C).

Figure 22A:
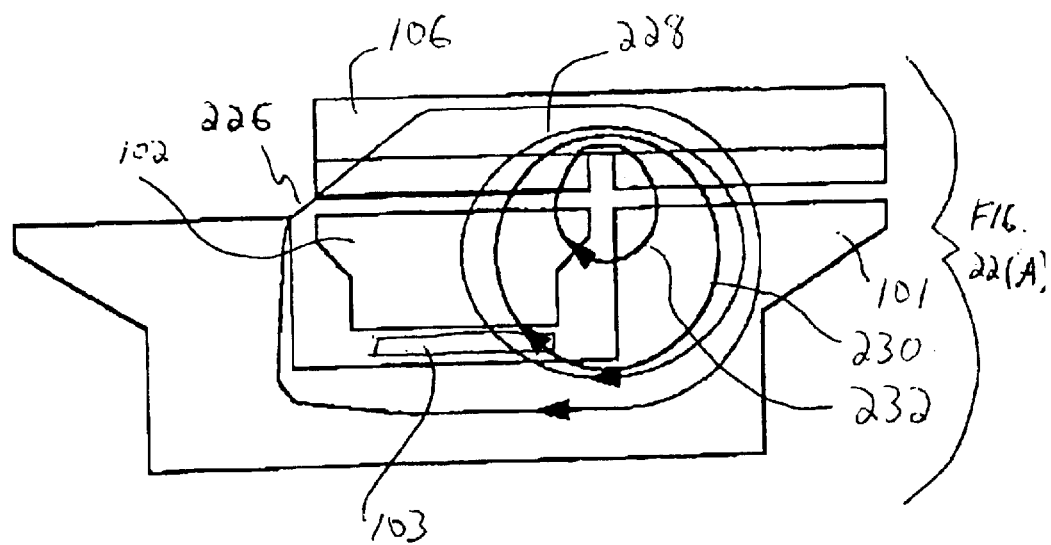
FIGS. 22(A), 22(B) and 22(C) are views showing generating conditions for a magnetic circuit of a linear sensor that bring about optimum sensitivity.
Figure 22B:
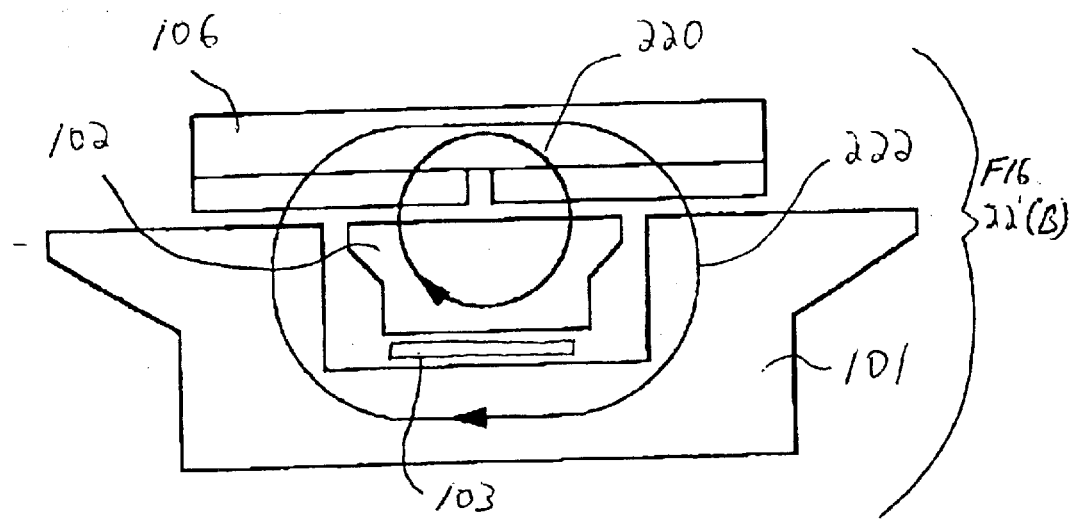
Figure 22C:
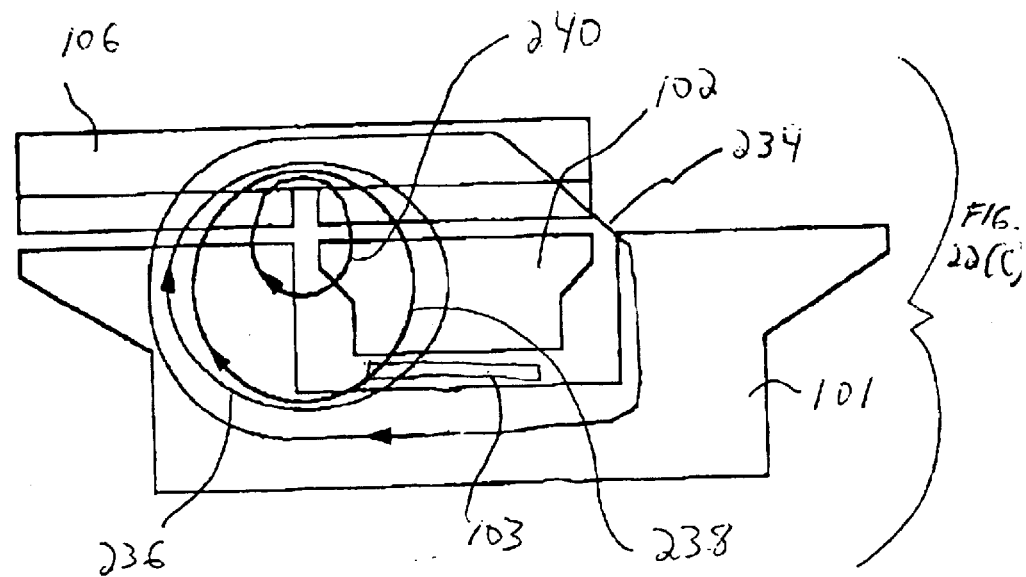

FIG. 22(A), 22(B) and 22(C) are views illustrating magnetic circuit forming conditions for the linear sensor of FIG. 9. As shown in the drawings, with the linear sensor of FIG. 9, two magnetic circuits, an inner magnetic circuit 220 and an outer magnetic circuit 222, are formed when the magnets are in the center, as shown in FIG. 22(B). When magnets move to the right, four magnet circuits 226, 228, 230 and 232 are formed, as shown in FIG. 22(A). Similarly, when the magnets move to the left, four magnetic circuits 234, 236, 238 and 240 are formed, as shown in FIG. 22(C).

Figure 23A:
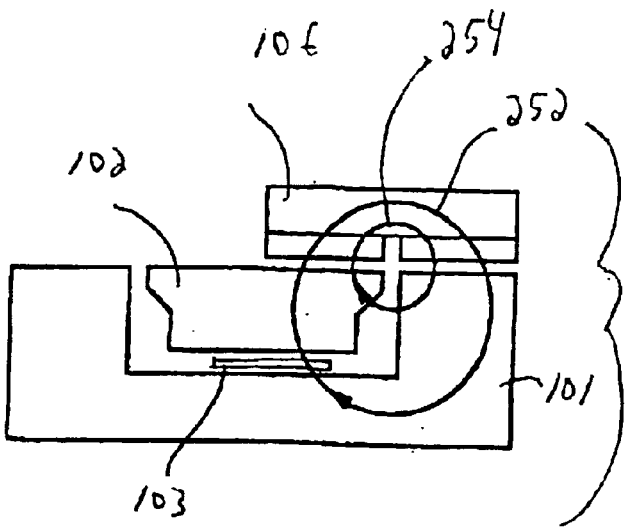
FIGS. 23(A), 23(B) and 23(C) are views showing generating conditions for a magnetic circuit that bring about the most compact linear sensor.
Figure 23B:
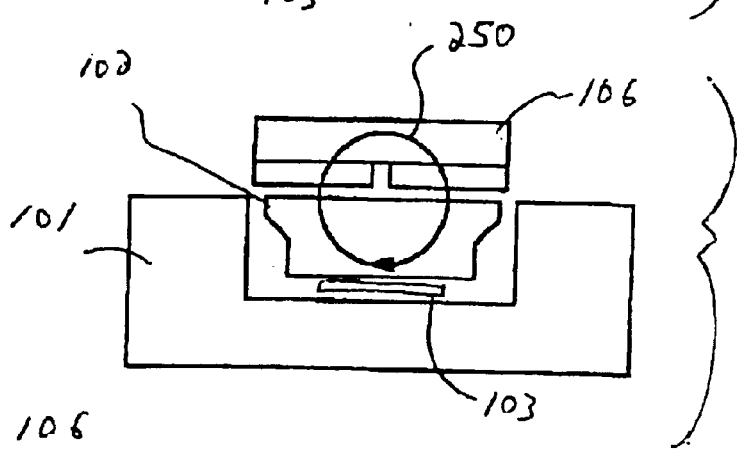
Figure 23C:
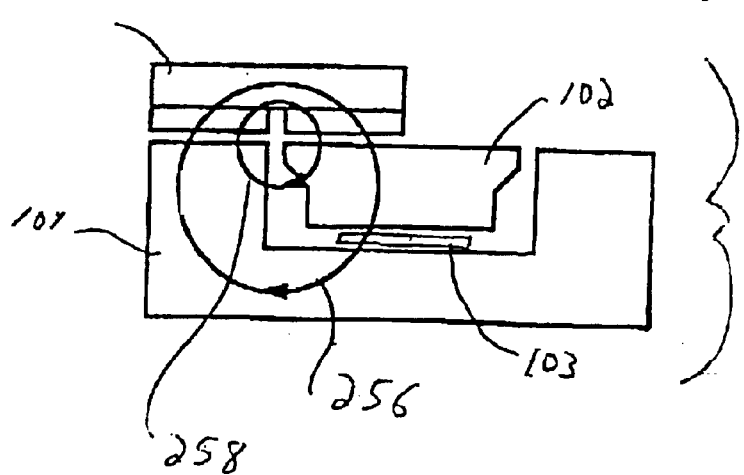

With the compact linear sensor of FIG. 17, just one magnetic circuit 250 is formed when the magnets are in the center, as shown in FIG. 23(B). Further, when the magnet moves to the right, two magnetic circuits 252 and 254 are formed, as shown in FIG. 23(A). Similarly, when the magnets move to the left, two magnetic circuits 256 and 258 are formed, as shown in FIG. 23(C). Thus, with the linear sensor of FIG. 17, just half of the magnetic circuits for the case in FIG. 9 are formed.

Figure 24:
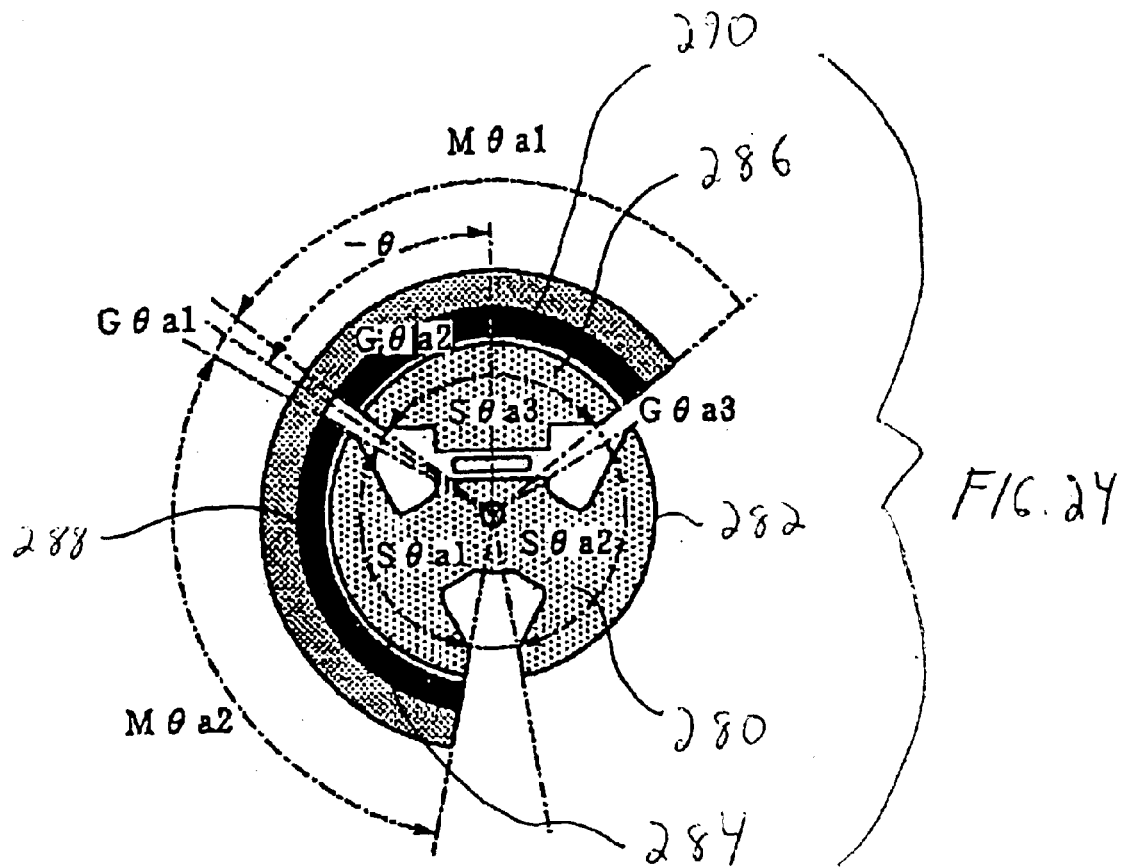
FIG. 24 is a view showing an embodiment of a rotary non-contact position sensor of the present invention for which sensitivity is most sensitive.
Figure 25:
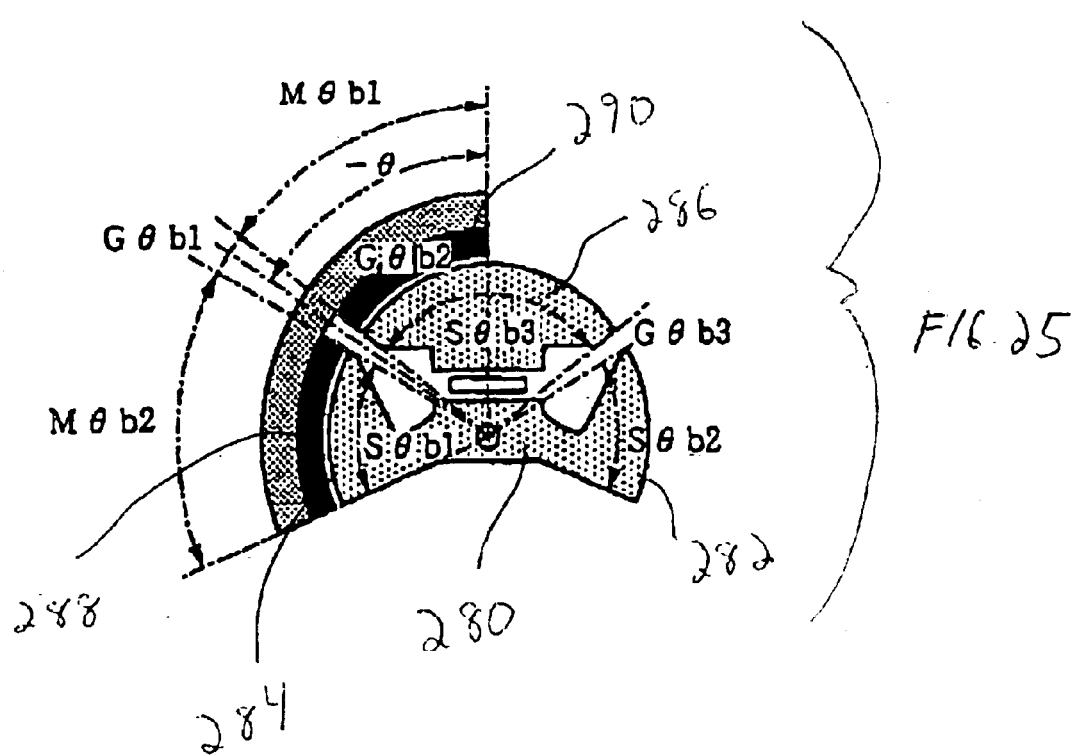
FIG. 25 is a view showing an embodiment of a rotary non-contact position sensor of the present invention which is the most compact.

FIG. 24 shows a rotary sensor of optimum sensitivity, and is a rotary sensor corresponding to the linear sensor of FIG. 9. Referring now to FIG. 25, the rotary sensor includes a first stator 280 having magnet facing sides 282 and 284, a second stator 286 and movable magnets 288 and 290. With a linear sensor the size of each part is expressed as a length, but here the size of each part is expressed as a central angle, i.e., the stroke is expressed as 2θ (±θ), the lengths of the moveable magnets are expressed as Mθa1 and Mθa2, the lengths of the magnet facing sides of the first and second stators are expressed as Sθa1, Sθa2 and Sθa3, respectively, and the intervening gaps are expressed as Gθa1, Gθa2 and Gθa3. That described in FIG. 10 to FIG. 16 (with the exception of FIG. 13) for the sensor of FIG. 9 also applies to these cases.

The relationships bringing about a rotary sensor with optimum sensitivity satisfy the following conditions:
① Regarding the lengths Mθa1 and Mθa2 of the two variable magnets, with the gap between the variable magnets being Gθa1, Mθa1=Mθa2=2θ−Gθa1.
② The length of the second stator Sθa3=Mθa1=2θ−Gθa1.
③ The length of the first stator Sθa3×3+Gθa2×2(Sθa1=Sθa2=Sθa3)≧6θ−Gθa1
④ The gap width is Gθa1=Gθa2=Gθa3.

FIG. 25 shows a rotary sensor corresponding to the linear sensor of FIG. 17 configured to be optimally compact. Here, the size of each part is expressed as an angle, i.e., the stroke is expressed as 2θ (±θ), the lengths of the moveable magnets are expressed as Mθb1 and Mθb2, the lengths of the first and second stators are expressed as Sθb1, Sθb2 and Sθb3, and the intervening gaps are expressed as Gθb1, Gθb2 and Gθb3. That described in FIG. 18 to FIG. 21 for the sensor of FIG. 17 also applies to these cases.

Therefore, the following relationships are to be fulfilled, taking the stroke to be 2θ, to give a rotary sensor of optimum compactness.
① Regarding the lengths Mθb1 and Mθb2 of the two variable magnets, with the gap between the variable magnets to be Gθb1, Mθb1=Mθb2=2θ−Gθb1.
② The length of the second stator Sθb3=2Mθb1=2θ−Gθb1.

③ The length of the first stator $S\theta b3 \times 2 + G\theta b2 \times 2$ ($S\theta b1 = S\theta b2 = S\theta b3/2) \geq 4\theta$.

④ The gap width is $G\theta b1 = G\theta b2 = G\theta b3$.

Comparing the rotary sensor of FIG. 24 and the rotary sensor of FIG. 25, the sensitivity is approximately twice for the rotary sensor of FIG. 24. This is described using FIGS. 26(A), 26(B) and 26(C), and FIGS. 27(A), 27(B) and 27(C).

FIGS. 26(A), 26(B) and 26(C) are views illustrating magnetic circuit forming conditions for the rotary sensor of FIG. 24. As shown in the drawings, with the rotary sensor of FIG. 24, an inner magnetic circuit 300 and an outer magnetic circuit 302, are formed when the magnets are in the center (FIG. 26(B)). When the magnets rotate to the left, four magnetic circuits 306, 308, 310 and 312 are formed, as shown in FIG. 26(A). When the magnets rotate to the right, four magnetic circuits 314, 316, 318 and 320 are formed, as shown in FIG. 26(C).

Figure 27A:
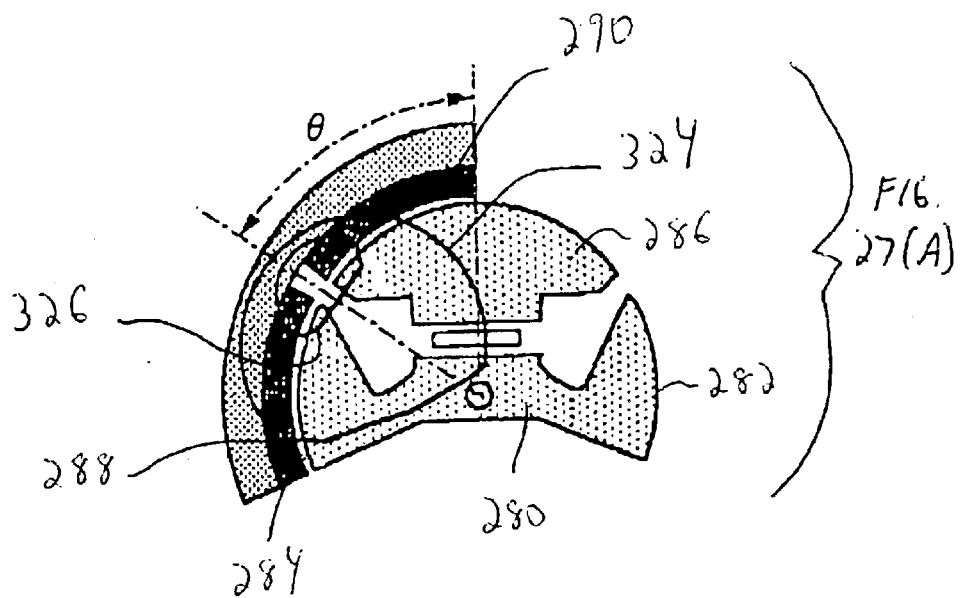
FIGS. 27(A), 27(B) and 27(C) are views showing generating conditions for a magnetic circuit that bring about the most compact rotary sensor.
Figure 27B:
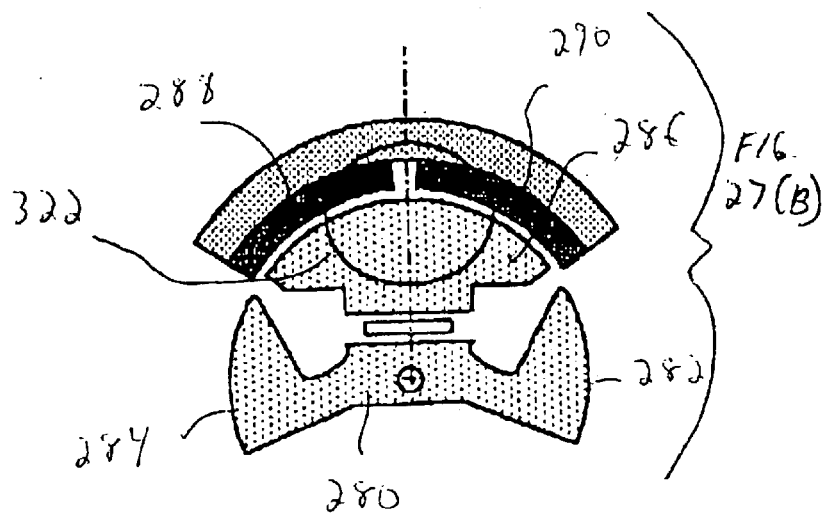
Figure 27C:
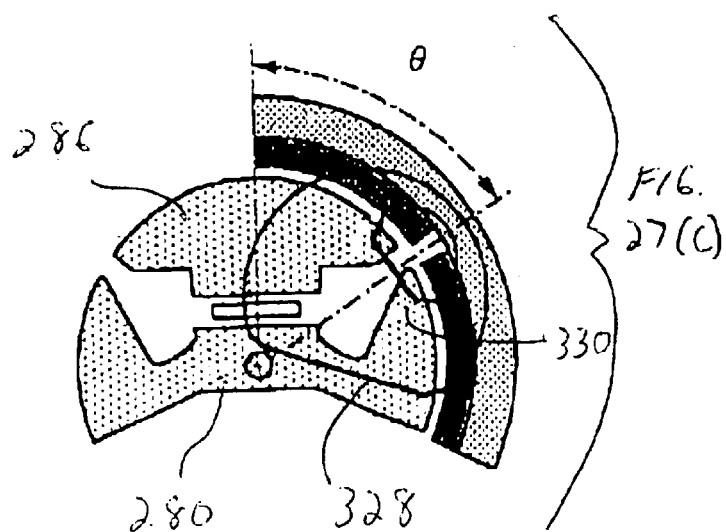

With the compact rotary sensor of FIG. 25, just one magnetic circuit 322 is formed when the magnets are in the center in FIG. 27(B). When the magnets rotate to the left, two magnetic circuits 324 and 326 are formed, as shown in FIG. 27(A). When the magnets rotate to the right, two magnetic circuits 328 and 330 are formed, as shown in FIG. 27(C). Therefore, with the rotary sensor of FIG. 25, just half of the magnetic circuits for the case in FIG. 24 are formed.

Figure 28A:
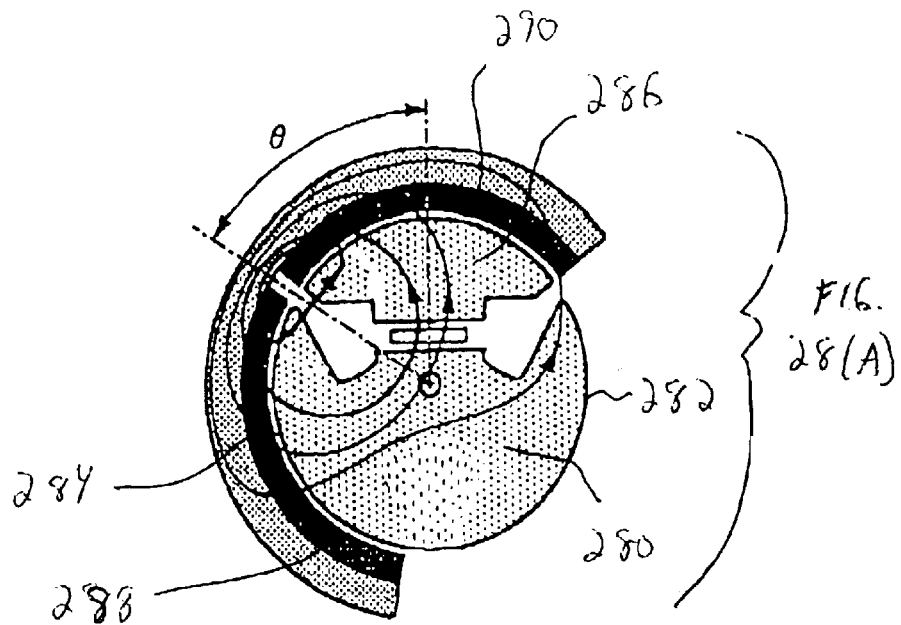
FIGS. 28(A), 28(B) and 28(C) are views showing a rotary sensor according to an additional embodiment of the present invention.
Figure 28B:
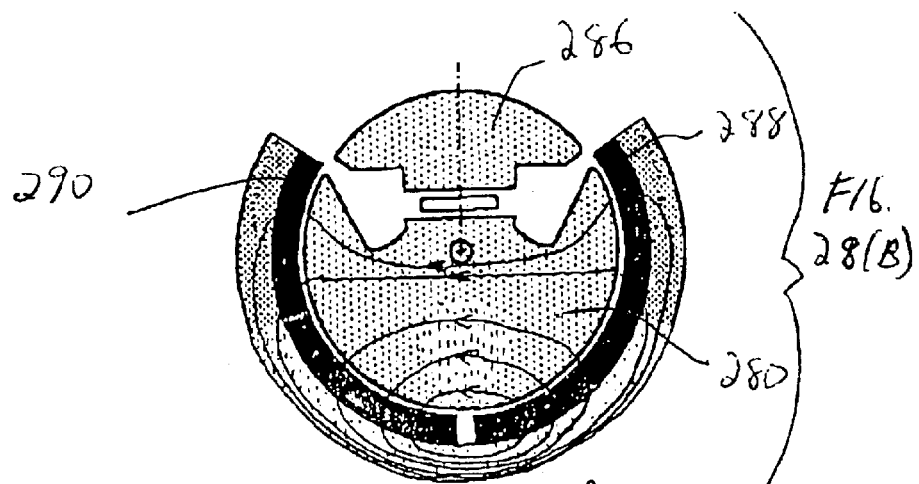
Figure 28C:
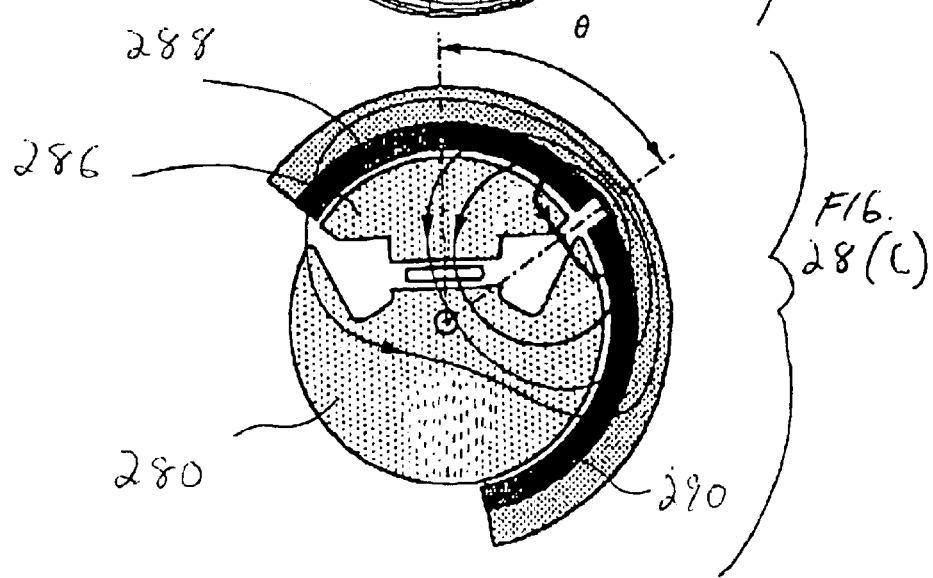

FIGS. 28(A), 28(B) and 28(C) are views showing a rotary sensor according to an additional embodiment of the present invention. The embodiment in FIGS. 28(A), 28(B) and 28(C) is similar to that in FIGS. 26(A), 26(B) and 26(B). However, in FIGS. 28(A), 28(B) and 28(C), magnets 288 and 290 are positioned in an opposite manner as compared to FIGS. 26(A), 26(B) and 26(C). For example, in FIG. 28(B), magnets 288 and 290 are positioned along the bottom of the figure, generally opposite to magnet facing sides of the first stator 280. By contrast, in FIG. 26(B), magnets 288 and 290 are positioned along the top of the figure, generally opposite to the magnet facing side of the second stator 286. Moreover, in the specific embodiment in FIGS. 28(A), 28(C) and 28(C), there is no gap in the first stator 280 between the magnet facing sides of the first stator 280. Magnetically, the magnet facing sides of the first stator 280 are different parts.

Figure 29:
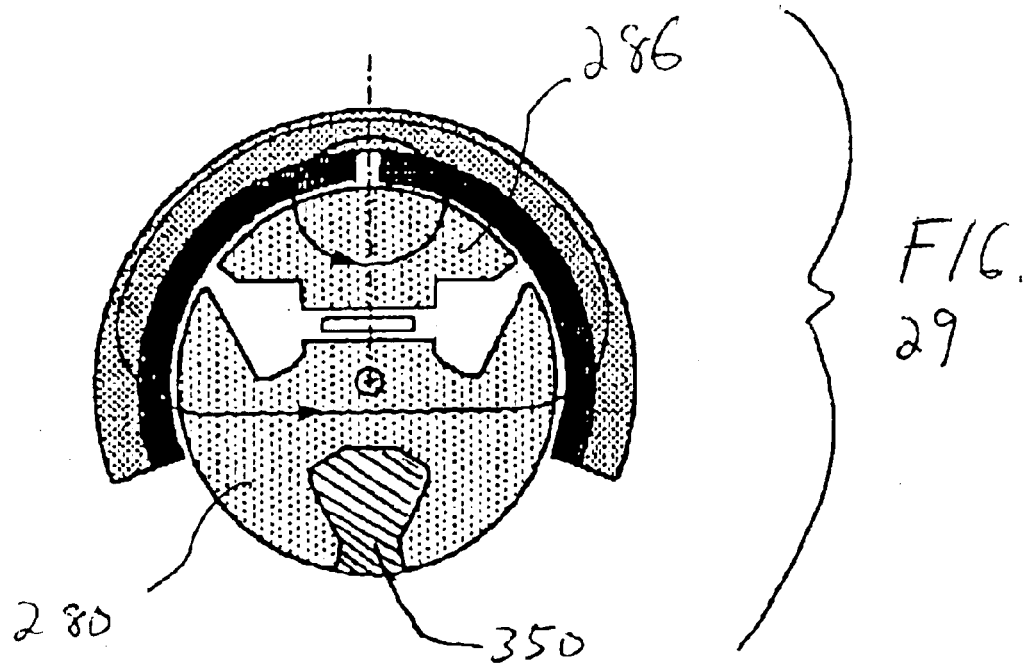
FIGS. 29 and 30 are views showing a rotary non-contact position sensor according to an additional embodiment of the present invention.
Figure 30:
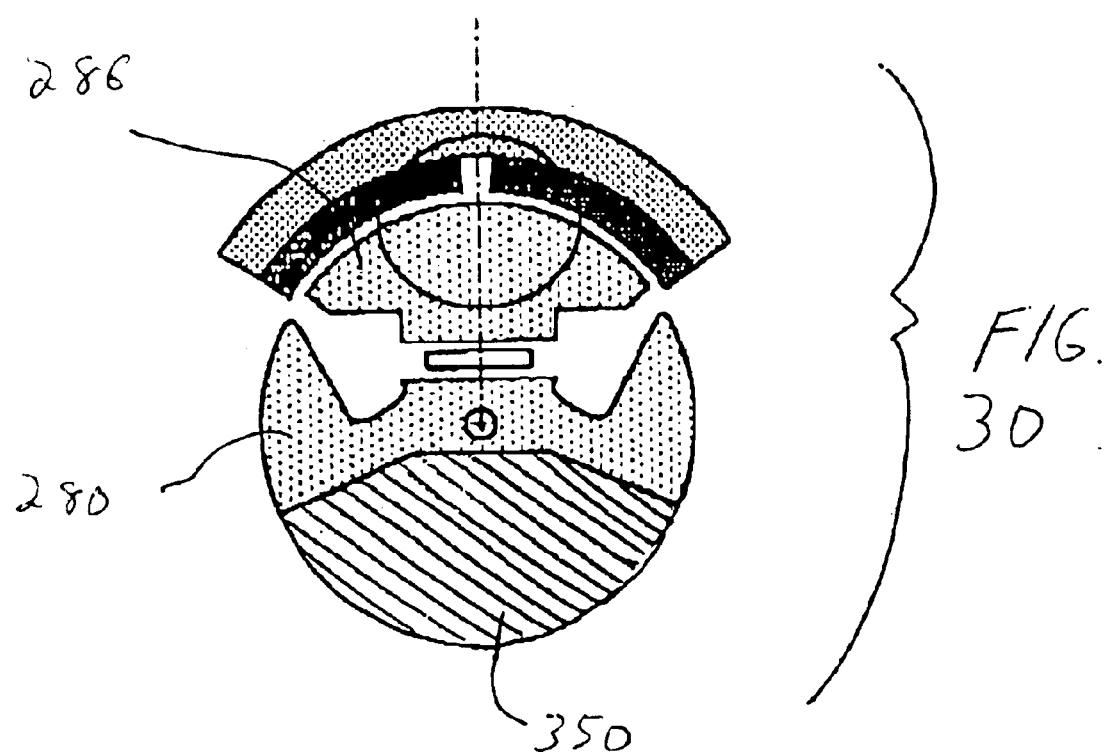

FIGS. 29 and 30 are views showing an embodiment of a rotary non-contact position sensor according to an additional embodiment of the present invention. Referring now to FIGS. 29 and 30, a portion 350 is filled with the same material as the first stator 280 so that there is no gap in the first stator 280 between the magnetic facing sides of the first stator 280. Physically, the two magnet facing sides of the first stator 280 together form one shape. However, magnetically, the magnet facing sides of the first stator 280 are two parts. The portion 350 is eliminated because it essentially represents wasted material. Therefore, in various embodiments of the present invention, a stator has first and second magnet facing sides which may or may not be separated by a gap in the stator.

The non-contact-position sensor of the present invention described above comprises a first stator having two magnet facing sides, a second stator having one magnet facing side aligned with the two magnet facing sides along a locus, a hall element provided between the first and second stators, and two magnets located next to each other along the direction of the locus opposite the three magnet facing sides so as to move freely along the locus. This enables implementation of a non-contact position sensor where, in the case of application to a rotary sensor, an arbitrary angle of usage can be set, and in the case of application to a linear sensor, a magnet can be made thick without increasing leakage of magnetic flux.

In the case of a linear sensor, the first and second stators are housed within a case, and a guide section maintaining a fixed distance between the magnets and the first and second stators, and a bearing supporting the slider in a freely retractable manner are formed within the case. A non-contact position sensor can therefore be obtained where a fixed position can be returned to even if the slider and magnets move due to vibrations etc. and upon which it is difficult for vibrations to exert any influence.

In the case of a rotary sensor, if the first and second stators are housed with the case, and a guide pin is erected at the cover of the case so as to pass through and support the first stator, with the rotor being axially supported in a freely rotatable manner at the guide pin passing through the first stator, even if the rotor and magnets move due to vibrations etc. the rotor and magnets can be made to return to a fixed location.

Further, when the two magnet facing sides of the first stator are located in a symmetrical manner at the sides of the one magnet facing side of the second stator, and lengths of the magnet facing sides of the first stator, a length of the magnet facing side of the second stator, lengths of the two magnets, a gap between the magnets, and gaps between the three magnet facing sides are taken to have a prescribed relationship, then a configuration where optimum sensitivity is achieved, or a configuration that is the most compact, can be brought about.

As described above, various of the magnetic fields are "closed-loop" magnetic fields. Generally, a "closed-loop" magnetic field stays within the outer perimeter of the device. For example, in FIGS. 27(A), 27(B) and 27(C), the various magnet circuits are contained within the outer perimeters of the stators. The concept of a "closed-loop" magnetic field is well-known. Moreover, the present invention is not limited to magnetic fields being closed-loop. Although various of the drawings show various magnetic fields, such magnetic fields are drawn for general illustration purposes. The magnetic fields are not necessarily drawn to proper scale and may also inaccurately show the closed-loop nature of the magnetic fields. Therefore, it should be understood that the present invention is not limited to the specific magnetic fields as drawn in the various figures.

In various above embodiments of a rotary sensor, the output characteristic angle has a cycle settable greater than 180°. In various practical embodiments, the output characteristic angle might have a cycle settable between 180° and 220°.

As described above, the present invention relates to a "non-contact" sensor. Generally, a non-contact sensor does not have physical contact between the stators and the magnets. By contrast, for example, some types of "contact" sensors use a brush which physically touches or "contacts" another element to provide the required effect. Non-contact sensors and contact sensors are well-known.

Various embodiments of the present invention relate to the use of only one hall element. However, the present invention is not limited to such use of a single hall element.

Various embodiments of the present invention relate to the use of two stators. However, the present invention is not limited to the use of a specific number of stators.

Various embodiments of the present invention relate to the use of a specific number of magnet facing sides. However, the present invention is not limited to the use of a specific number of magnet facing sides, or a specific number of magnet facing sides per stator.

Moreover, various embodiments of the present invention relate to stators have "magnet facing sides." A "magnet facing side" refers to a side of the stator which faces, and has a shape corresponding to, and opposing magnet. For example, with a linear sensor such as that in FIGS. 3(A), 3(B) and 3(C), magnet facing sides 101a, 101b and 102a have a flat shape corresponding to the flat shape of opposing, movable magnets 104 and 105. Similarly, with the rotary, or angle, sensor in FIG. 4, magnet facing sides 111a, 111b and 112a have an arc shape corresponding to the arc shape of opposing, movable magnets 114 and 115. Generally, in the case of a rotary sensor, the radii of arcs forming the magnets would be larger than the radii of the arcs forming the magnet facing sides of the stators. The concept of a magnet facing side of a stator is well-known in the art, would should be clearly understood from the drawings and disclosure herein.

Various embodiments of the present invention can be described in terms of the various magnet circuits produced in accordance with the position of the magnets. For example, as shown in FIG. 3, a non-contact sensor includes a magnet having a range of movement from a first position to a second position with a third position between the first and second positions, a first stator having first and second magnet facing sides, a second stator having a magnet facing side, and a hall element. Information is determined in accordance with changes in magnetic flux in the hall element corresponding to changes in magnetic fields passing through the hall element due to movement of the magnet. The magnet, the first stator, the second stator and the hall element are arranged so that (a) when the magnet is in the third position, a first magnetic circuit passes through the first and second magnet facing sides of the first stator, but does not pass through the second stator or the hall element, and a second magnetic circuit passes through the magnet facing side of the second stator and the magnet, but does not pass through the first stator or the hall element, (b) when the magnet is at the first position, a magnetic circuit passes through the second magnet facing side of the first stator, the magnet facing side of the second stator, the hall element and the magnet, but does not pass through the first magnet facing side of the first stator, and (c) when the magnet is at the second position, a magnetic circuit passes through the first magnet facing side of the first stator, the magnet facing side of the second stator, the hall element and the magnet, but does not pass through the second magnet facing side of the first stator.

By contrast, with the embodiments shown in FIGS. 22 and 26, the magnet, the first stator, the second stator and the hall element are arranged so that (a) when the magnet is in the third position, a first magnetic circuit passes through the first and second magnet facing sides of the first stator and the magnet, but does not pass through the second stator or the hall element, and a second magnetic circuit passes through the magnet facing side of the second stator and the magnet, but does not pass through the first stator or the hall element, (b) when the magnet is at the first position, a first magnetic circuit passes through the second magnet facing side of the first stator, the magnet facing side of the first stator and the magnet, but does not pass through the first magnet facing side of the first stator or the hall element, second and third magnetic circuits each pass through the second magnet facing side of the first stator, the magnet facing side of the second stator, the hall element and the magnet, but do not pass through the first magnet facing side of the first stator, and a fourth magnetic circuit passes through the second magnet facing side of the first stator and the magnet, but does not pass through the first magnet facing side of the first stator, the magnet facing side of the second stator or the hall element, and (c) when the magnet is at the second position, a first magnetic circuit passes through the first magnet facing side of the first stator, the magnet facing side of the first stator and the magnet, but does not pass through the second magnet facing side of the first stator or the hall element, second and third magnetic circuits each pass through the first magnet facing side of the first stator, the magnet facing side of the second stator, the hall element and the magnet, but do not pass through the second magnet facing side of the first stator, and a fourth magnetic circuit passes through the first magnet facing side of the first stator and the magnet, but does not pass through the second magnet facing side of the second stator, the magnet facing side of the second stator or the hall element.

Further, with the embodiments shown, for example, in FIGS. 23 and 27, the magnet, the first stator, the second stator and the hall element are arranged so that (a) when the magnet is in the third position, a magnetic circuit passes through the magnet facing side of the second stator and the magnet, but does not pass through the first stator or the hall element, (b) when the magnet is at the first position, a first magnetic circuit passes through the second magnet facing side of the first stator, the magnet facing side of the second stator and the magnet, but does not pass through the first magnet facing side of the first stator or the hall element, and a second magnetic circuit passes through the second magnet facing side of the first stator, the magnet facing side of the second stator, the hall element and the magnet, but does not pass through the first magnet facing side of the first stator, and (c) when the magnet is at the second position, a first magnetic circuit passes through the first magnet facing side of the first stator, the magnet facing side of the second stator and the magnet, but does not pass through the second magnet facing side of the second stator or the hall element, and a second magnetic circuit passes through the first magnet facing side of the first stator, the magnet facing side of the second stator, the hall element and the magnet, but does not pass through the second magnet facing side of the first stator.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-contact position sensor comprising:

a first stator having first and second magnet facing sides extending from a base of the first stator;

a second stator having a magnet facing side aligned with the first and second magnet facing sides of the first stator along a locus and extending from a base of the second stator;

a hall element between the base of the first and the base of the second stator; and first and second magnets located next to each other along the locus opposite the first and second magnet facing sides of the first stator and the magnet facing side of the second stator so as to move freely along the locus.

2. The non-contact position sensor of claim 1, wherein the locus is a straight line locus, and the first and second magnets are plate-shaped magnets supported by a slider which is slidable along the locus.

3. The non-contact position sensor of claim 1, wherein the locus is a circular arc-shaped locus, and the first and second magnets are curved plate-shaped magnets supported by a rotor which is rotatable along the locus.

4. The non-contact position sensor of claim 2, further comprising.

a case, the first and second stators being housed in the case so that a fixed distance is maintained between the first and second magnets and the first and second stators; and a bearing supporting the slider in a freely slidable manner.

5. The non-contact position sensor of claim 4, further comprising at least one roller cooperating with the slider to allow the slider to slide.

6. The non-contact position sensor of claim 5, wherein the first and second magnets together have a center of gravity, said at least one roller being a pair of rollers positioned substantially at the center of gravity in a direction orthogonal to a sliding direction of the slider.

7. The non-contact position sensor of claim 3, further comprising:

a case housing the first and second stators; and a guide pin in the case and supporting the first stator, the rotor being axially supported in a freely rotatable manner at the guide pin.

8. The non-contact position sensor of claim 3, further comprising:

a case housing the first and second stators; and a hollow coupling section formed at the rotor, wherein the case has a projection section fitting with the hollow coupling section.

9. The non-contact position sensor of claim 2, wherein the first and second magnet facing sides of the first stator are located in a symmetrical manner at first and second sides, respectively, of the magnet facing side of the second stator, lengths of the first and second magnet facing sides of the first stator are Sa1 and Sa2, respectively, a length of the magnet facing side of the second stator is Sa3, lengths of the first and second magnets are Ma1 and Ma2, respectively, a gap between the first and second magnets is Ga1, gaps between the first magnet facing side of the first stator and the magnet facing side of the second stator and between the magnet facing side of the second stator and the second magnet facing side of the first stator are Ga2 and Ga3, respectively, and a stroke of the first and second magnets is 2L, so that the following relationships are satisfied $$Ma1 = Ma2 = 2L - Ga1$$
$$Ga1 = Ga2 = Ga3$$
$$Sa1 = Sa2 = Sa3 = Ma1.$$

10. The non-contact position sensor of claim 2, wherein the first and second magnet facing sides of the first stator are located in a symmetrical manner at first and second sides, respectively, of the magnet facing side of the second stator, lengths of the first and second magnet facing sides of the first stator are Sb1 and Sb2, respectively, a length of the magnet facing side of the second stator is Sb3, lengths of the first and second magnets are Mb1 and Mb2, respectively, a gap between the first and second magnets is Gb1, gaps between the first magnet facing side of the first stator and the magnet facing side of the second stator and between the magnet facing side of the second stator and the second magnet facing side of the first stator are Gb2 and Gb3, respectively, and a stroke of the first and second magnets is 2L, so that the following relationships are satisfied $$Mb1 = Mb2 = L - Gb1/2$$
$$Gb1 = Gb2 = Gb3$$
$$Sb1 = Sb2 = Sb3/2 = Mb1.$$

11. The non-contact position sensor of claim 3, wherein the first and second magnet facing sides of the first stator are located in a symmetrical manner at first and second sides, respectively, of the magnet facing side of the second stator, central angles of the first and second magnet facing sides of the first stator are $S\theta a1$ and $S\theta a2$, respectively, a central angle of the magnet facing side of the second stator is $S\theta a3$, central angles of the first and second magnets are $M\theta a1$ and $M\theta a2$, respectively, a gap between the first and second magnets is $G\theta a1$, gaps between the first magnet facing side of the first stator and the magnet facing side of the second stator and between the magnet facing side of the second stator and the second magnet facing side of the first stator are $G\theta a2$ and $G\theta a3$, respectively, and a stroke of the first and second magnets is $2\theta$, so that the following relationships are satisfied $$M\theta a1 = M\theta a2 = 2\theta - G\theta a1$$
$$G\theta a1 = G\theta a2 = G\theta a3$$
$$S\theta a1 = S\theta a2 = S\theta a3 = M\theta a1.$$

12. The non-contact position sensor of claim 3, wherein the first and second magnet facing sides of the first stator are located in a symmetrical manner at first and second sides, respectively, of the magnet facing side of the second stator, central angles of the first and second magnet facing sides of the first stator are $S\theta b1$ and $S\theta b2$, respectively, a central angle of the magnet facing side of the second stator is $S\theta b3$, central angles of the first and second magnets are $M\theta b1$ and $M\theta b2$, respectively, a gap between the first and second magnets is $G\theta b1$, gaps between the first magnet facing side of the first stator and the magnet facing side of the second stator and between the magnet facing side of the second stator and the second magnet facing side of the first stator are $G\theta b2$ and $G\theta b3$, respectively, and a stroke of first and second magnets is $2\theta$, so that the following relationships are satisfied $$M\theta b1 = M\theta b2 = \theta - G\theta b1/2$$
$$G\theta b1 = G\theta b2 = G\theta b3$$
$$S\theta b1 = S\theta b2 = S\theta b3/2 = M\theta b1.$$

13. The non-contact position sensor of claim 2, wherein a gap between the first and second stators into which the hall element is inserted, a gap between the first and second magnets, a gap between the first magnet facing side of the first stator and the magnet facing side of the second stator, and a gap between the magnet facing side of the second stator and the second magnet facing side of the first stator are substantially equal.

14. The non-contact position sensor of claim 2, wherein width in a direction orthogonal to the locus of the first and second stators and width in a direction orthogonal to the locus of the first and second magnets is substantially the same.

15. The non-contact position sensor of claim 3, wherein width in a direction orthogonal to the locus of the first and second stators and width in a direction orthogonal to the locus of the first and second magnets is substantially the same.

16. The non-contact position sensor of claim 1, wherein there is no gap in the first stator between the first and second magnet facing sides.

17. An apparatus comprising:
a non-contact position sensor including
a first stator having first and second magnet facing sides, and
a second stator having a magnet facing side between the first and second magnet facing sides of the first stator and aligned with the first and second magnet facing sides of the first stator along a locus, the locus being a path along which at least one magnet of the non-contact position sensor is movable.

18. The apparatus of claim 17, wherein the locus is a straight line locus.

19. The apparatus of claim 17, wherein the locus is a circular arc-shaped locus.

20. The apparatus of claim 17, wherein the non-contact position sensor is a linear sensor.

21. The apparatus of claim 17, wherein the non-contact position sensor is a rotary sensor.

22. The apparatus comprising:
a non-contact position sensor including
a first stator having first and second magnet facing sides,
a second stator having a magnet facing side between the first and second magnet facing sides of the first stator and aligned with the first and second magnet facing sides of the first stator along a locus, and
first and second magnets along the locus opposite the first and second magnet facing sides of the first stator and the magnet facing side of the second stator and movable along the locus.

23. The apparatus of claim 22, wherein the first and second magnet facing sides of the first stator are located in a symmetrical manner at first and second sides, respectively, of the magnet facing side of the second stator, lengths of the first and second magnet facing sides of the first stator are $Sa1$ and $Sa2$, respectively, a length of the magnet facing side of the second stator is $Sa3$, lengths of the first and second magnets are $Ma1$ and $Ma2$, respectively, a gap between the first and second magnets is $Ga1$, gaps between the first magnet facing side of the first stator and the magnet facing side of the second stator and between the magnet facing side of the second stator and the second magnet facing side of the first stator are $Ga2$ and $Ga3$, respectively, and a stroke of the first and second magnets is $2L$, so that the following relationships are satisfied $$Ma1 = Ma2 = 2L - Ga1$$
$$Ga1 = Ga2 = Ga3$$
$$Sa1 = Sa2 = Sa3 = Ma1.$$

24. The apparatus of claim 22, wherein the first and second magnet facing sides of the first stator are located in a symmetrical manner at first and second sides, respectively, of the magnet facing side of the second stator, lengths of the first and second magnet facing sides of the first stator are $Sb1$ and $Sb2$, respectively, a length of the magnet facing side of the second stator is $Sb3$, lengths of the first and second magnets are $Mb1$ and $Mb2$, respectively, a gap between the first and second magnets is $Gb1$, gaps between the first magnet facing side of the first stator and the magnet facing side of the second stator and between the magnet facing side of the second stator and the second magnet facing side of the first stator are $Gb2$ and $Gb3$, respectively, and a stroke of the first and second magnets is $2L$, so that the following relationships are satisfied $$Mb1 = Mb2 = L - Gb1/2$$
$$Gb1 = Gb2 = Gb3$$
$$Sb1 = Sb2 = Sb3/2 = Mb1.$$

25. The apparatus of claim 22, wherein the locus is a circular arc-shaped locus, the first and second magnet facing sides of the first stator are located in a symmetrical manner at first and second sides, respectively, of the magnet facing side of the second stator, central angles of the first and second magnet facing sides of the first stator are $S\theta a1$ and $S\theta a2$, respectively, a central angle of the magnet facing side of the second stator is $S\theta a3$, central angles of the first and second magnets are $M\theta a1$ and $M\theta a2$, respectively, a gap between the first and second magnets is $G\theta a1$, gaps between the first magnet facing side of the first stator and the magnet facing side of the second stator and between the magnet facing side of the second stator and the second magnet facing side of the first stator are $G\theta a2$ and $G\theta a3$, respectively, and a stroke of the first and second magnets is $2\theta$, so that the following relationships are satisfied $$M\theta a1 = M\theta a2 = 2\theta - G\theta a1$$
$$G\theta a1 = G\theta a2 = G\theta a3$$
$$S\theta a1 = S\theta a2 = S\theta a3 = M\theta a1.$$

26. The apparatus of claim 22, wherein the locus is a circular arc-shaped locus, the first and second magnet facing sides of the first stator are located in a symmetrical manner at first and second sides, respectively, of the magnet facing side of the second stator, central angles of the first and second magnet facing sides of the first stator are $S\theta b1$ and $S\theta 2$, respectively, a central angle of the magnet facing side of the second stator is $S\theta b3$, central angles of the first and second magnets are $M\theta b1$ and $M\theta b2$, respectively, a gap between the first and second magnets is $G\theta b1$, gaps between the first magnet facing side of the first stator and the magnet facing side of the second stator and between the magnet facing side of the second stator and the second magnet facing side of the first stator are $G\theta b2$ and $G\theta b3$, respectively, and a stroke of first and second magnets is $2\theta$, so that the following relationships are satisfied $$M\theta b1 = M\theta b2 = \theta - G\theta b1/2$$
$$G\theta b1 = G\theta b2 = G\theta b3$$
$$S\theta b1 = S\theta b2 = S\theta b3/2 = M\theta b1.$$

27. The apparatus of claim 22, wherein width in a direction orthogonal to the locus of the first and second stators and width in a direction orthogonal to the locus of the first and second magnets is substantially the same.

28. The apparatus of claim 22, wherein
the non-contact position sensor includes a hall element, and a gap between the first and second stators in which the hall element is positioned, a gap between the first and second magnets, a gap between the first magnet facing side of the first stator and the magnet facing side of the second stator, and a gap between the magnet facing side of the second stator and the second magnet facing side of the first stator are substantially equal.

29. The apparatus of claim 17, wherein there is no gap in the first stator between the first and second magnetic facing sides.

30. The apparatus of claim 20, wherein there is no gap in the first stator between the first and second magnetic facing sides.

31. The apparatus of claim 21, wherein there is no gap in the first stator between the first and second magnetic facing sides.

32. An apparatus comprising:
a non-contact sensor including a magnet having a range of movement from a first position to a second position with a third position between the first and second positions, a first stator having first and second magnet facing sides, a second stator having a magnet facing side, and a hall element, information being determined in accordance with changes in magnetic flux in the hall element corresponding to changes in magnetic fields passing through the hall element due to movement of the magnet, wherein the magnet, the first stator, the second stator and the hall element are arranged so that,
when the magnet is in the third position, a first magnetic circuit passes through the first and second magnet facing sides of the first stator and the magnet, but does not pass through the second stator or the hall element, and a second magnetic circuit passes through the magnet facing side of the second stator and the magnet, but does not pass through the first stator or the hall element,
when the magnet is at the first position, a first magnetic circuit passes through the second magnet facing side of the first stator, the magnet facing side of the first stator and the magnet, but does not pass through the first magnet facing side of the first stator or the hall element, second and third magnetic circuits each pass through the second magnet facing side of the first stator, the magnet facing side of the second stator, the hall element and the magnet, but do not pass through the first magnet facing side of the first stator, and a fourth magnetic circuit passes through the second magnet facing side of the first stator and the magnet, but does not pass through the first magnet facing side of the first stator, the magnet facing side of the second stator or the hall element, and
when the magnet is at the second position, a first magnetic circuit passes through the first magnet facing side of the first stator, the magnet facing side of the first stator and the magnet, but does not pass through the second magnet facing side of the first stator or the hall element, second and third magnetic circuits each pass through the first magnet facing side of the first stator, the magnet facing side of the second stator, the hall element and the magnet, but do not pass through the second magnet facing side of the first stator, and a fourth magnetic circuit passes through the first magnet facing side of the first stator and the magnet, but does not pass through the second magnet facing side of the second stator, the magnet facing side of the second stator or the hall element.

33. The apparatus of claim 32, wherein the sensor is a linear sensor.

34. The apparatus of claim 32, wherein the sensor is a rotary sensor.

35. A non-contact position sensor comprising:
a first stator having first and second magnet facing sides extending from a base of the first stator;
a second stator having a magnet facing side aligned with the first and second magnet facing sides of the first stator along a locus and extending from a base of the second stator;
a hall element between the base of the first and the base of the second stator; and
at least one magnet opposite at least one of the group consisting of the first magnet facing side of the first stator, the second magnet facing side of the first stator and the magnet facing side of the second stator.

36. The non-contact position sensor of claim 35, wherein said at least one magnet comprises first and second magnets positioned along the locus opposite the first and second magnet facing sides of the first stator and the magnet facing side of the second stator so as to move freely along the locus, the locus being a straight line locus, the first and second magnets being plate-shaped magnets supported by a slider which is slidable along the locus.

37. The non-contact position sensor of claim 35, wherein said at least one magnet comprises first and second magnets positioned along the locus opposite the first and second magnet facing sides of the first stator and the magnet facing side of the second stator so as to move freely along the locus, the locus being a circular arc-shaped locus, and the first and second magnets being curved plate-shaped magnets supported by a rotor which is rotatable along the locus.

38. The non-contact position sensor of claim 36, further comprising:
a case, the first and second stators being housed in the case so that a fixed distance is maintained between the first and second magnets and the first and second stators; and
a bearing supporting the slider in a freely slidable manner.

39. The non-contact position sensor of claim 38, further comprising at least one roller cooperating with the slider to allow the slider to slide.

40. The non-contact position sensor of the claim 39, wherein first and second magnets together have a center of gravity, said at least one roller being a pair of rollers positioned substantially at the center of gravity in a direction orthogonal to a sliding direction of the slider.

41. The non-contact position sensor of claim 35, further comprising:
a case housing the first and second stators; and
a guide pin in the case and supporting the first stator, the rotor being axially supported in a freely rotatable manner at the guide pin.

42. The non-contact position sensor of claim 37, further comprising:
a case housing the first and second stators; and
a hollow coupling section formed at the rotor, wherein the case has a projection section fitting with the hollow coupling section.

43. The non-contact position sensor of the claim 36, wherein the first and second magnet facing sides of the first stator are located in a symmetrical manner at first and second sides, respectively, of the magnet facing side of the second stator, lengths of the first and second magnet facing sides of the first stator are Sa1 and Sa2, respectively, a length of the magnet facing side of the second stator is Sa3, lengths of the first and second magnets are Ma1 and Ma2, respectively, a gap between the first and second magnets is Ga1, gaps between the first magnet facing side of the first stator and the magnet facing side of the second stator and between the magnet facing side of the second stator and the second magnet facing side of the first stator are Ga2 and Ga3, respectively, and a stroke of the first and second magnets is 2L, so that the following relationships are satisfied $$Ma1 = Ma2 = 2L - Ga1$$

$$Ga1 = Ga2 = Ga3$$

$$Sa1 = Sa2 = Sa3 = Ma1.$$

44. The non-contact position sensor of claim 36, wherein the first and second magnet facing sides of the first stator are located in a symmetrical manner at first and second sides, respectively, of the magnet facing side of the second stator, lengths of the first and second magnet facing sides of the first stator are Sb1 and Sb2, respectively, a length of the magnet facing side of the second stator is Sb3, lengths of the first and second magnets are Mb1 and Mb2, respectively, a gap between the first and second magnets is Gb1, gaps between the first magnet facing side of the first stator and the magnet facing side of the second stator and between the magnet facing side of the second stator and the second magnet facing side of the first stator are Gb2 and Gb3, respectively, and a stroke of the first and second magnets is 2L, so that the following relationships are satisfied $$Mb1 = Mb2 = L - Gb1/2$$

$$Gb1 = Gb2 = Gb3$$

$$Sb1 = Sb2 = Sb3/2 = Mb1.$$

45. The non-contact position sensor of claim 37, wherein the first and second magnet facing sides of the first stator are located in a symmetrical manner at first and second sides, respectively, of the magnet facing side of the second stator, central angles of the first and second magnet facing sides of the first stator are $S\theta a1$ and $S\theta a2$, respectively, a central angle of the magnet facing side of the second stator is $S\theta a3$, central angles of the first and second magnets are $M\theta a1$ and $M\theta a2$, respectively, a gap between the first and second magnets is $G\theta a1$, gaps between the first magnet facing side of the first stator and the magnet facing side of the second stator and between the magnet facing side of the second stator and the second magnet facing side of the first stator are $G\theta a2$ and $G\theta a3$, respectively, and a stroke of the first and second magnets is $2\theta$, so that the following relationships are satisfied $$M\theta a1 = M\theta a2 = 2\theta - G\theta a1$$

$$G\theta a1 = G\theta a2 = G\theta a3$$

$$S\theta a1 = S\theta a2 = S\theta a3 = M\theta a1.$$

46. The non-contact position sensor of claim 37, wherein the first and second magnet facing sides of the first stator are located in a symmetrical manner at first and second sides, respectively, of the magnet facing side of the second stator, central angles of the first and second magnet facing sides of the first stator are $S\theta b1$ and $S\theta b2$, respectively, a central angle of the magnet facing side of the second stator is $S\theta b3$, central angles of the first and second magnets are $M\theta b1$ and $M\theta b2$, respectively, a gap between the first and second magnets is $G\theta b1$, gaps between the first magnet facing side of the first stator and the magnet facing side of the second stator and between the magnet facing side of the second stator and the second magnet facing side of the first stator are $G\theta b2$ and $G\theta b3$, respectively, and a stroke of first and second magnets is $2\theta$, so that the following relationships are satisfied $$M\theta b1 = M\theta b2 = \theta - G\theta b1/2$$

$$G\theta b1 = G\theta b2 = G\theta b3$$

$$S\theta b1 = S\theta b2 = S\theta b3/2 = M\theta b1.$$

47. The non-contact position sensor of claim 36, wherein a gap between the first and second stators into which the hall element is inserted, a gap between the first and second magnets, a gap between the first magnet facing side of the first stator and the magnet facing side of the second stator, and a gap between the magnet facing side of the second stator and the second magnet facing side of the first stator are substantially equal.

48. The non-contact position sensor of width claim 36, wherein width in a direction orthogonal to the locus of the first and second stators and width in a direction orthogonal to the locus of the first and second magnets is substantially the same.

49. The non-contact position sensor of claim 37, wherein width in a direction orthogonal to the locus of the first and second stators and width in a direction orthogonal to the locus of the first and second magnets is substantially the same.

50. The non-contact position sensor of claim 35, wherein there is no gap in the first stator between the first and second magnet facing sides.

51. The non-contact position sensor of claim 35, wherein said at least one magnet comprises at least two magnets.

52. The non-contact position sensor of each claim 35, wherein each magnet of said at least one magnet moves freely along the locus.

53. The non-contact position sensor of claim 35, wherein said at least one magnet comprises at least two magnets which move freely along the locus.

54. A non-contact position sensor comprising:
 a first stator having first and second magnet facing sides;
 a second stator having a magnet facing side aligned with the first and second magnet facing sides of the first stator along a locus;
 a hall element between the first and second stators; and
 first and second magnets located next to each other along the locus opposite the first and second magnet facing sides of the first stator and the magnet facing side of the second stator so as to move freely along the locus, wherein
 the locus is a circular arc-shaped locus, and the first and second magnets are curved plate-shaped magnets supported by a rotor which is rotatable along the locus, and
 the first and second magnet facing sides of the first stator are located in a symmetrical manner at first and second sides, respectively, of the magnet facing side of the second stator, central angles of the first and second magnet facing sides of the first stator are $S\theta a1$ and $S\theta a2$, respectively, a central angle of the magnet facing side of the second stator is $S\theta a3$, central angles of the first and second magnets are $M\theta a1$ and $M\theta a2$, respectively, a gap between the first and second magnets is $G\theta a1$, gaps between the first magnet facing side of the first stator and the magnet facing side of the second stator and between the magnet facing side of the second stator and the second magnet facing side of the first stator are $G\theta a2$ and $G\theta a3$, respectively, and a stroke of the first and second magnets is 2θ, so that the following relationships are satisfied $$M\theta a1 = M\theta a2 = 2\theta - G\theta a1$$
$$G\theta a1 = G\theta a2 = G\theta a3$$
$$S\theta a1 = S\theta a2 = S\theta a3 = M\theta a1.$$

55. An apparatus comprising:
a non-contact position sensor including
a first stator having first and second magnet facing sides, and
a second stator having a magnet facing side between the first and second magnet facing sides of the first stator and aligned with the first and second magnet facing sides of the first stator along a locus, wherein
the non-contact position sensor further includes first and second magnets along the locus opposite the first and second magnet facing sides of the first stator and the magnet facing side of the second stator and movable along the locus, and
the locus is a circular arc-shaped locus, the first and second magnet facing sides of the first stator are located in a symmetrical manner at first and second sides, respectively, of the magnet facing side of the second stator, central angles of the first and second magnet facing sides of the first stator are Sθa1 and Sθa2, respectively, a central angle of the magnet facing side of the second stator is Sθa3, central angles of the first and second magnets are Mθa1 and Mθa2, respectively, a gap between the first and second magnets is Gθa1, gaps between the first magnet facing side of the first stator and the magnet facing side of the second stator and between the magnet facing side of the second stator and the second magnet facing side of the first stator are Gθa2 and Gθa3, respectively, and a stroke of the first and second magnets is 2θ, so that the following relationships are satisfied $$M\theta a1 = M\theta a2 = 2\theta - G\theta a1$$
$$G\theta a1 = G\theta a2 = G\theta a3$$
$$S\theta a1 = S\theta a2 = S\theta a3 = M\theta a1.$$

56. A non-contact position sensor comprising:
a first stator having first and second magnet facing sides;
a second stator having a magnet facing side aligned with the first and second magnet facing sides of the first stator along a locus;
a hall element between the first and second stators; and
at least one magnet opposite at least one of the group consisting of the first magnet facing side of the first stator, the second magnet facing side of the first stator and the magnet facing side of the second stator, wherein
said at least one magnet comprises first and second magnets positioned along the locus opposite the first and second magnet facing sides of the first stator and the magnet facing side of the second stator so as to move freely along the locus, the locus being a circular arc-shaped locus, and the first and second magnets being curved plate-shaped magnets supported by a rotor which is rotatable along the locus, and
the first and second magnet facing sides of the first stator are located in a symmetrical manner at first and second sides, respectively, of the magnet facing side of the second stator, central angles of the first and second magnet facing sides of the first stator are Sθa1 and Sθa2, respectively, a central angle of the magnet facing side of the second stator is Sθa3, central angles of the first and second magnets are Mθa1 and Mθa2, respectively, a gap between the first and second magnets is Gθa1, gaps between the first magnet facing side of the first stator and the magnet facing side of the second stator and between the magnet facing side of the second stator and the second magnet facing side of the first stator are Gθa2 and Gθa3, respectively, and a stroke of the first and second magnets is 2θ, so that the following relationships are satisfied $$M\theta a1 = M\theta a2 = 2\theta - G\theta a1$$
$$G\theta a1 = G\theta a2 = G\theta a3$$
$$S\theta a1 = S\theta a2 = S\theta a3 = M\theta a1.$$

57. The non-contact position sensor of claim 1, wherein the first magnet and the second magnet have substantially the same length along a direction of movement, and the first and second magnets are arranged such that magnet poles oppose each other.

* * * * *

UNITED STATES PATENT AND TRADEMARK OFFICE
CERTIFICATE OF CORRECTION

PATENT NO. : 6,867,582 B2  Page 1 of 1
DATED : March 15, 2005
INVENTOR(S) : Tetsuo Muraji et al.

It is certified that error appears in the above-identified patent and that said Letters Patent is hereby corrected as shown below:

Column 22,
Line 45, after "wherein" insert -- the --.

Column 23,
Line 38, change "M$\theta$" to -- M$\theta$a1 --.

Column 24,
Line 31, delete "each".

Signed and Sealed this

Sixth Day of September, 2005

JON W. DUDAS
*Director of the United States Patent and Trademark Office*